(12) United States Patent
Dang et al.

(10) Patent No.: US 12,282,791 B2
(45) Date of Patent: *Apr. 22, 2025

(54) VIRTUALIZED I/O

(71) Applicant: Hewlett Packard Enterprise Development LP, Spring, TX (US)

(72) Inventors: Leon Dang, San Jose, CA (US); Keith Reynolds, Issaquah, WA (US); Isaac R. Nassi, Los Gatos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/589,529

(22) Filed: Jan. 31, 2022

(65) Prior Publication Data

US 2022/0229688 A1 Jul. 21, 2022

Related U.S. Application Data

(63) Continuation of application No. 16/186,329, filed on Nov. 9, 2018, now Pat. No. 11,275,600.

(60) Provisional application No. 62/586,035, filed on Nov. 14, 2017.

(51) Int. Cl.
| | |
|---|---|
| *G06F 9/455* | (2018.01) |
| *G06F 12/0868* | (2016.01) |
| *G06F 12/0891* | (2016.01) |
| *G06F 12/1009* | (2016.01) |
| *G06F 13/10* | (2006.01) |
| *G06F 13/24* | (2006.01) |

(52) U.S. Cl.
CPC .......... *G06F 9/45558* (2013.01); *G06F 9/455* (2013.01); *G06F 12/0868* (2013.01); *G06F 12/0891* (2013.01); *G06F 12/1009* (2013.01); *G06F 13/105* (2013.01); *G06F 13/24* (2013.01); *G06F 2009/45579* (2013.01); *G06F 2009/45583* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 9,830,082 | B1 | 11/2017 | Srinivasan |
| 10,846,117 | B1 * | 11/2020 | Steinberg ............... G06F 21/56 |
| 2008/0294825 | A1 | 11/2008 | Mahalingam |
| 2010/0049892 | A1 | 2/2010 | Schwarz |

(Continued)

OTHER PUBLICATIONS

Shan et al., "Distributed Shared Persistent Memory", Sep. 2017, ACM ISBN 978-1-4503-5028-0/17/09 (Year: 2017).

(Continued)

*Primary Examiner* — Wynuel S Aquino
(74) *Attorney, Agent, or Firm* — Yao Legal Services, Inc.

(57) ABSTRACT

Distributed I/O virtualization includes receiving, at a first physical node in a plurality of physical nodes, an indication of a request to transfer data from an I/O device on the first physical node to a set of guest physical addresses. An operating system is executing collectively across the plurality of physical nodes. It further includes writing data from the I/O device to one or more portions of physical memory local to the first physical node. It further includes mapping the set of guest physical addresses to the written one or more portions of physical memory local to the first physical node.

18 Claims, 22 Drawing Sheets

(56) References Cited

U.S. PATENT DOCUMENTS

| | | | |
|---|---|---|---|
| 2010/0138208 A1 | 6/2010 | Hattori | |
| 2010/0169883 A1 | 7/2010 | Bogin | |
| 2010/0223611 A1* | 9/2010 | Mahalingam | G06F 9/4812 |
| | | | 718/1 |
| 2013/0067122 A1 | 3/2013 | Pavlov | |
| 2014/0059543 A1* | 2/2014 | Nassi | H04L 67/10 |
| | | | 718/1 |
| 2014/0244877 A1 | 8/2014 | Red | |
| 2015/0347167 A1* | 12/2015 | Bonazzola | G06F 9/44505 |
| | | | 718/1 |
| 2016/0055060 A1* | 2/2016 | Resch | G06F 11/1076 |
| | | | 714/764 |
| 2016/0188354 A1 | 6/2016 | Goldsmith | |
| 2016/0291996 A1* | 10/2016 | Tsirkin | G06F 12/1009 |
| 2017/0149921 A1* | 5/2017 | Nassi | H04L 67/2885 |
| 2017/0235760 A1 | 8/2017 | Sharpe | |
| 2017/0249090 A1 | 8/2017 | Arcangeli | |
| 2017/0262214 A1* | 9/2017 | Venkatesh | G06F 3/0664 |
| 2018/0011661 A1 | 1/2018 | Madampath | |
| 2018/0074966 A1 | 3/2018 | Cheng | |
| 2018/0150246 A1* | 5/2018 | Catrein | G06F 3/0689 |
| 2018/0239715 A1* | 8/2018 | Tsirkin | G06F 13/28 |
| 2018/0365167 A1* | 12/2018 | Eckert | G06F 12/1036 |
| 2020/0326971 A1* | 10/2020 | Yang | G06F 9/45558 |

OTHER PUBLICATIONS

International Search Report and Written Opinion received for PCT Patent Application No. PCT/US18/60278, mailed on Jan. 24, 2019, 8 pages.

* cited by examiner

VIRTUALIZED I/O

CROSS REFERENCE TO OTHER APPLICATIONS

This application is a continuation of U.S. patent application Ser. No. 16/186,329, entitled VIRTUALIZED I/O filed Nov. 9, 2018 which is incorporated herein by reference for all purposes, which claims priority to U.S. Provisional Application No. 62/586,035, entitled VIRTUALIZED I/O filed Nov. 14, 2017 which is incorporated herein by reference for all purposes.

BACKGROUND OF THE INVENTION

In a distributed computing environment, fulfilling I/O operations may be challenging, as the resources involved in the I/O operation, such as the I/O device, data, etc. may be remote from each other. For example, the movement of data to and from an I/O device across the distributed architecture when performing the I/O operation may require significant processing and network overhead.

BRIEF DESCRIPTION OF THE DRAWINGS

Various embodiments of the invention are disclosed in the following detailed description and the accompanying drawings.

DETAILED DESCRIPTION

Figure 1:
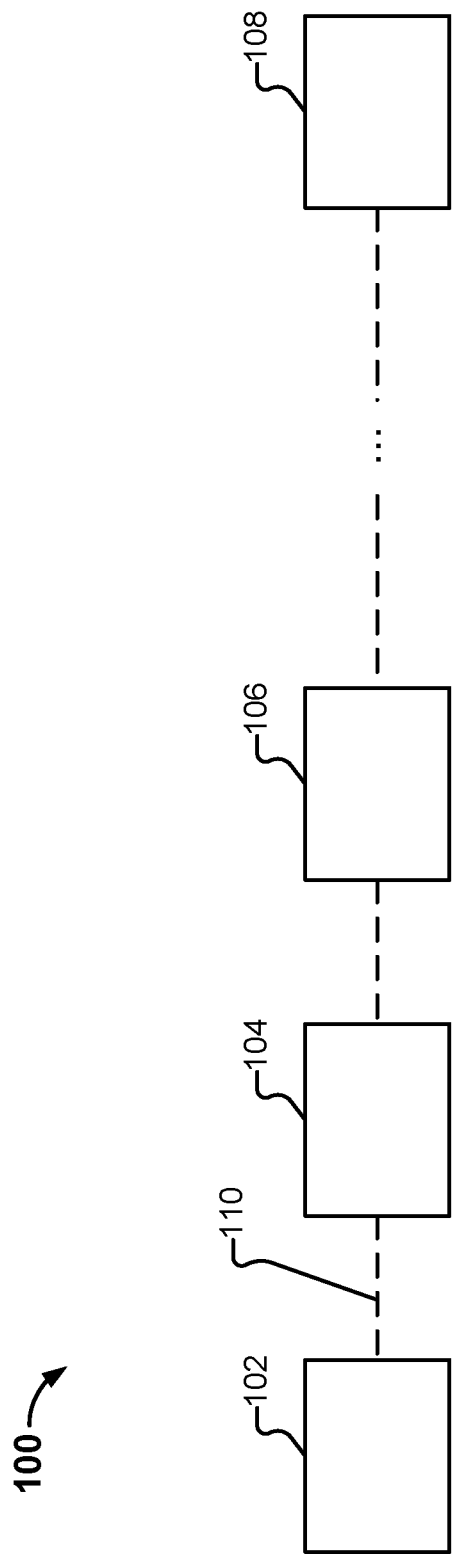
FIG. 1 illustrates an embodiment of a computer system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Existing I/O virtualization standards such as virtIO are not designed to operate in a distributed virtualized environment spanning a multi-server distributed computing architecture. Described herein are techniques for distributed I/O virtualization in a multi-server distributed computing architecture.

One example of a multi-server distributed computing architecture is a software defined server, which will be described in further detail below. While example embodiments of distributed I/O virtualization in a software defined server are described below for illustrative purposes, the distributed I/O virtualization techniques described herein may be variously adapted to accommodate any other type of multi-server distributed architecture, as appropriate.

Further, while enhancements and extensions to the virtIO standard to implement a distributed version of virtIO are described herein for illustrative purposes, the techniques described herein may be variously adapted to accommodate any other type of I/O virtualization standard, as appropriate.

The distributed I/O virtualization technique described herein provides various benefits, such as efficient I/O virtualization and emulation in a distributed computing environment, such as more efficient use of network and processing resources, as will be described in further detail below.

Software Defined Server Overview

As used herein, a software defined server refers to an assembly or collection or cluster of hardware modules (e.g., computing nodes or individual computers) that run a distributed virtual machine manager referred to herein as a "hyper-kernel."

Compared to existing distributed multi-server architectures, on which a single physical node or server supports many virtual machines, in a software defined server, a single virtual machine that spans many physical nodes/servers is supported.

Details regarding an example implementation of a software defined server are described below.

FIG. 1 illustrates an embodiment of a computer system. System 100 is also referred to herein as a "software-defined server," an "enterprise supercomputer," and a "mainframe." In the example shown, system 100 includes a plurality of nodes (e.g., nodes 102-108) located in close proximity (e.g., located within the same rack or nearby racks of servers). In other embodiments, multiple racks of nodes (e.g., located within the same facility) can be used in the system. Further, the techniques described herein can also be used in conjunction with distributed systems.

The nodes are interconnected with an interconnect (110) such as 10-gigabit or 40-gigabit Ethernet, direct PCI-to-PCI, and/or InfiniBand. Each node comprises commodity server-class hardware components (e.g., a blade in a rack with its attached or contained peripherals). The interconnect may be dedicated, but need not be. The interconnect may also be high-speed, but need not be. In the example shown in FIG. 1, each node includes multiple physical processor chips. Each physical processor chip (also referred to as a "socket") includes multiple cores, and each core has multiple hyper-threads.

Figure 2:
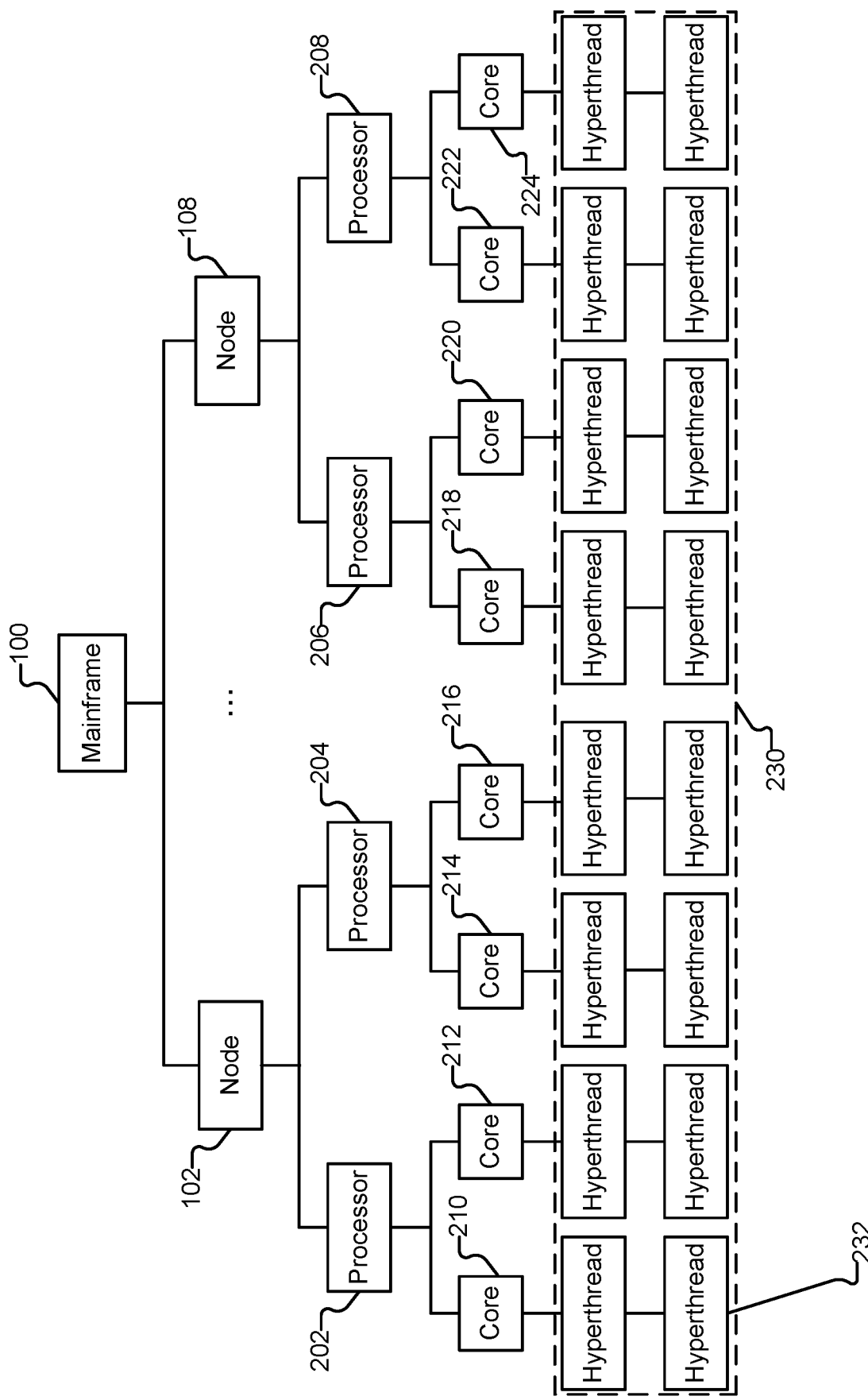
FIG. 2 illustrates the physical structure of the computer system as a hierarchy.

As illustrated in FIG. 2, the physical structure of system 100 forms a hierarchy (230) (from the bottom) of hyper-threads (232), cores (210-224), physical processor chips (202-208), and nodes (102-108 (with nodes 104, 106, etc. omitted from the figure and represented as ellipses)). The tree depicted in FIG. 2 is of a fixed size, defined by the hardware configuration.

As will be described in more detail below, each enterprise supercomputer (e.g., system 100) runs a single instance of an operating system. Both the operating system, and any applications, can be standard commercially available software and can run on system 100. In the examples described herein, the operating system is Linux, however other operating systems can also be used, such as Microsoft Windows, Mac OS X, or FreeBSD.

Figure 3A:
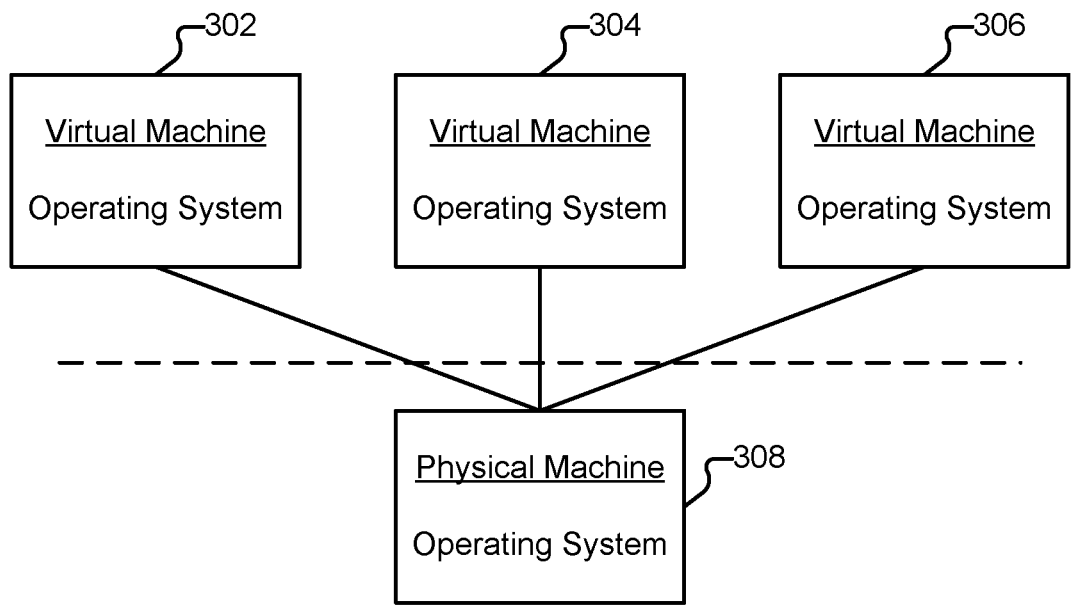
FIG. 3A depicts a virtualized computing environment in which multiple virtual machines (with respective multiple guest operating systems) run on a single physical machine.
Figure 3B:
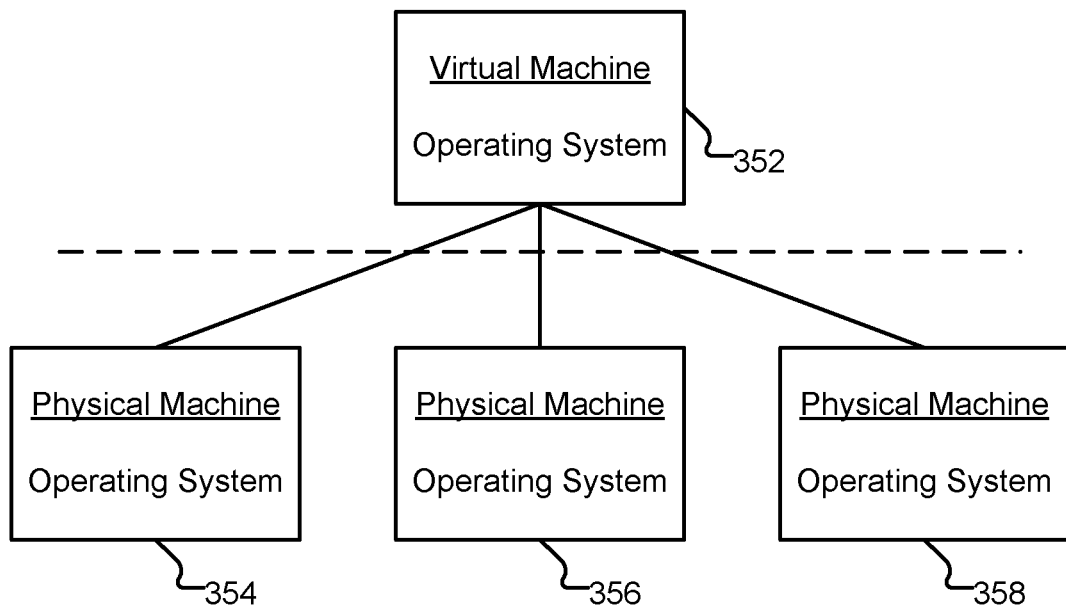
FIG. 3B depicts a virtualized computing environment in which multiple physical machines collectively run a single virtual operating system.

In a traditional virtualized computing environment, multiple virtual machines may run on a single physical machine. This scenario is depicted in FIG. 3A. In particular, three virtual machines (302-306) are running three guest operating systems on a single physical machine (308), which has its own host operating system. In contrast, using the techniques described herein, multiple physical machines (354-358) collectively run a single virtual operating system (352), as depicted in FIG. 3B.

Figure 4A:
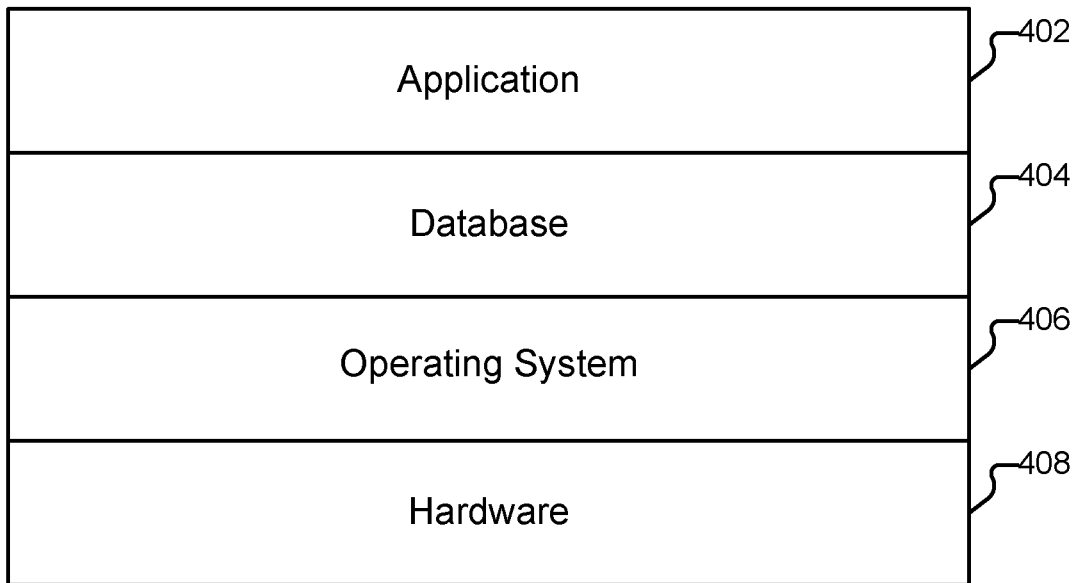
FIG. 4A depicts an example of a software stack.
Figure 4B:
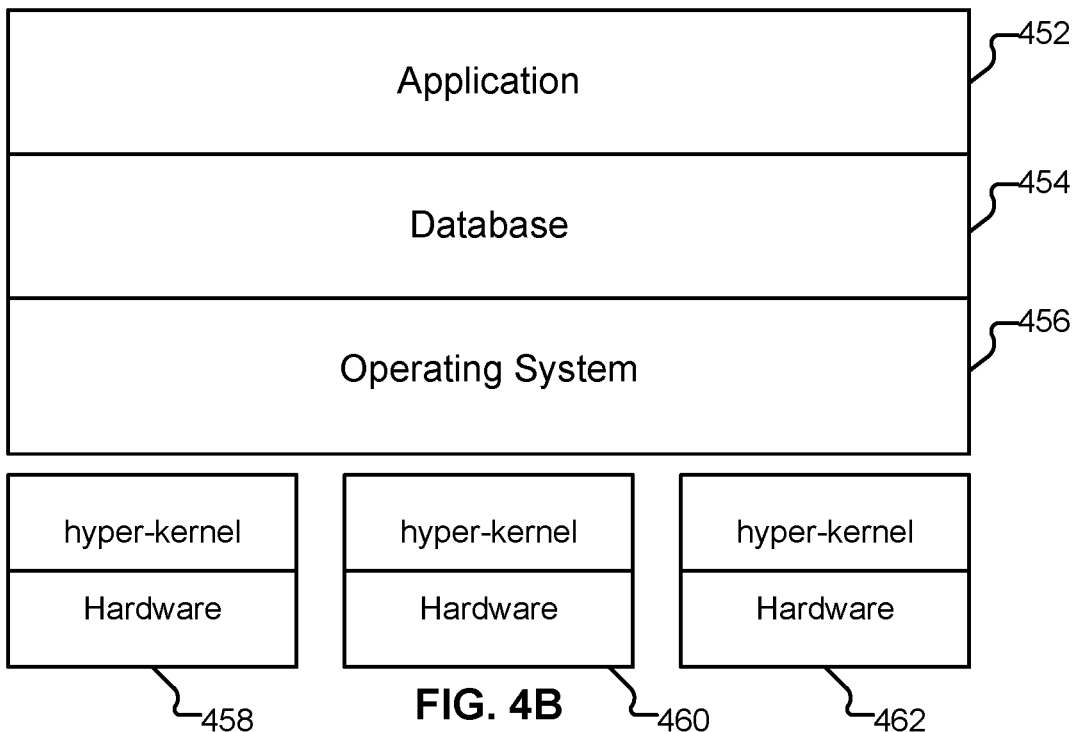
FIG. 4B depicts an example of a software stack.

One example of a software stack is depicted in FIG. 4A. Such a stack may typically be used in traditional computing environments. In the stack shown in FIG. 4A, an application (402) sits above a database engine (404), which in turn sits upon an operating system (406), underneath which lies hardware (408). FIG. 4B depicts a software stack used in some embodiments. As with the stack shown in FIG. 4A, an application (452) sits above a database engine (454), which in turn sits upon an operating system (456). However, underneath the operating system and above the hardware is a layer of software (referred to herein as a hyper-kernel) that observes the system running in real time and optimizes the system resources to match the needs of the system as it operates. The hyper-kernel (one example of a virtual machine manager) conceptually unifies the RAM, processors, and I/O (Input Output resources for example Storage, Networking resources) of a set of commodity servers, and presents that unified set to the operating system. Because of this abstraction, the operating system will have the view of a single large computer, containing an aggregated set of processors, memory, and I/O. As will be described in more detail below, the hyper-kernel optimizes use of resources. The hyper-kernel can also help optimize other I/O system resources such as networks and storage. In some embodiments, based on observations and profiles of running software, performance indicators (hints) are provided to upper layers (e.g., database management systems) about the dynamic performance of the system that can further improve overall system performance.

The hyper-kernel can be ported to all major microprocessors, memory, interconnect, persistent storage, and networking architectures. Further, as hardware technology evolves (e.g., with new processors, new memory technology, new interconnects, and so forth), the hyper-kernel can be modified as needed to take advantage of industry evolution.

As shown in FIG. 4B, operating system 456 is running collectively across a series of nodes (458-462), each of which has a hyper-kernel running on server hardware. Specifically, the operating system is running on a virtual environment that is defined by the collection of hyper-kernels. As will be described in more detail below, the view for operating system 456 is that it is running on a single hardware platform that includes all of the hardware resources of the individual nodes 458-462. Thus, if each of the nodes includes 1 TB of RAM, the operating system will have as a view that it is running on a hardware platform that includes 3 TB of RAM. Other resources, such as processing power, and I/O resources can similarly be collectively made available to the operating system's view.

Figure 5:
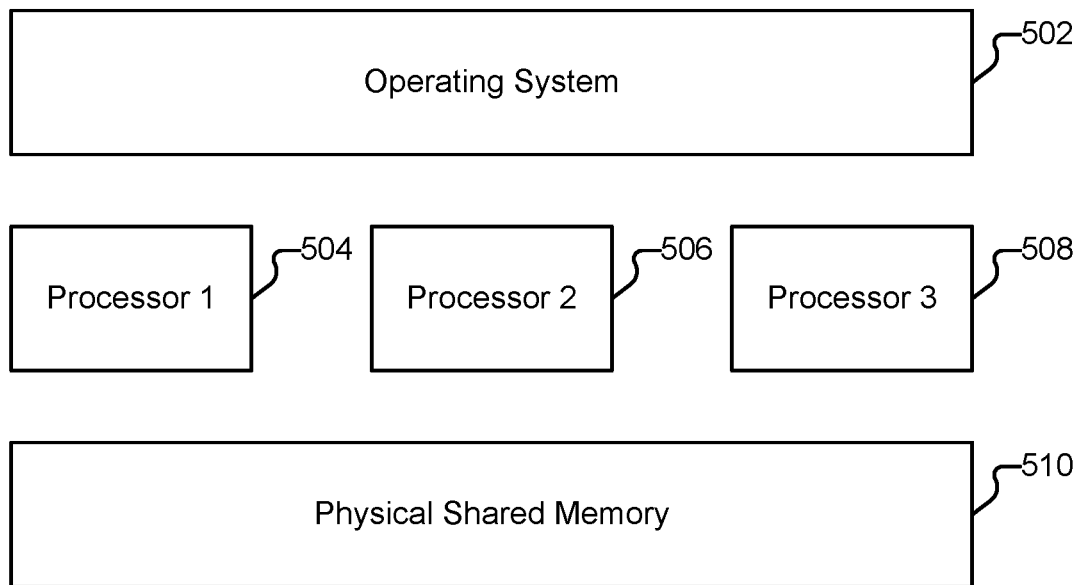
FIG. 5 depicts an example of an operating system's view of hardware on an example system.

FIG. 5 depicts an example of an operating system's view of hardware on an example system. Specifically, operating system (502) runs on top of processors 504-508 and physical shared memory 510. As explained above, an operating system can run on either a traditional computing system or on an enterprise supercomputer such as is shown in FIG. 1. In either case, the view of the operating system will be that it has access to processors 504-508 and physical shared memory 510.

Figure 6A:
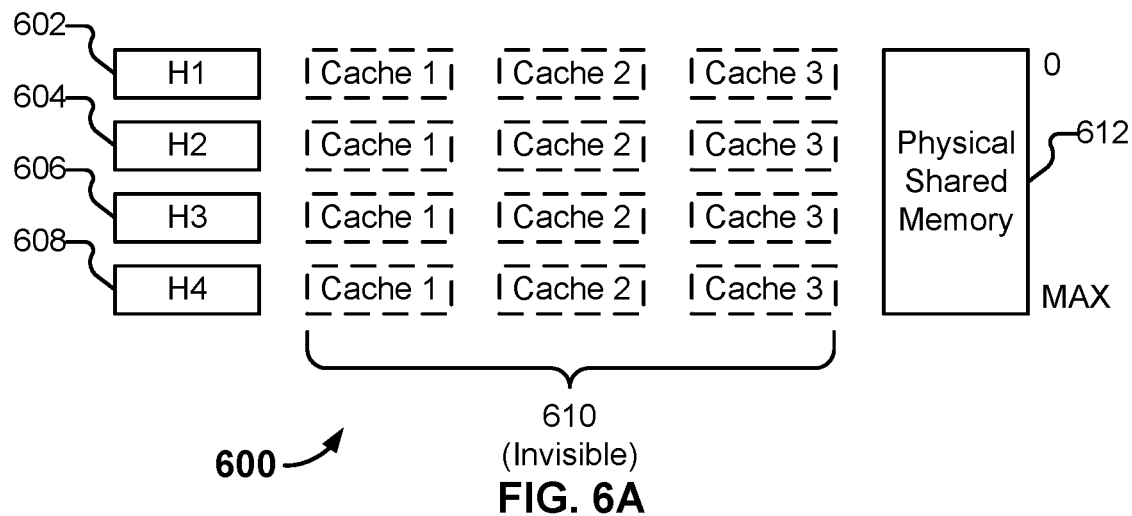
FIG. 6A depicts an example of a hyperthread's view of hardware on a single node.

FIG. 6A depicts an example of a hyperthread's view of hardware on a single node. In this example, a node has four hyperthreads denoted H1 (602) through H4 (608). Each hyperthread can access all portions of physical shared memory 612. Physical shared memory 612 is linear, labeled location 0 through a maximum amount, "max." The node also includes three levels of cache (610).

Figure 6B:
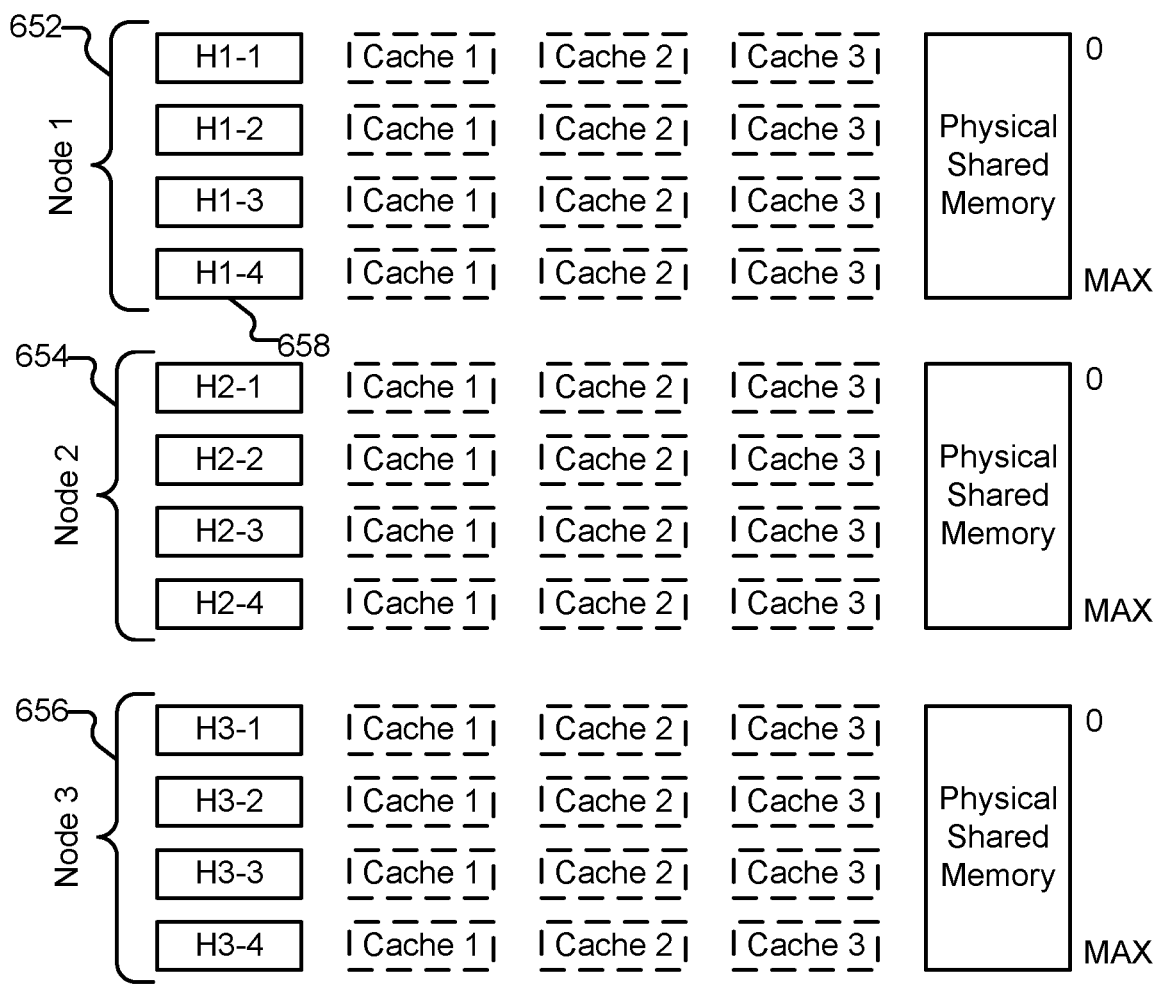
FIG. 6B depicts an example of a hyper-kernel's view of hardware on an example system.

FIG. 6B depicts an example of a hyper-kernel's view of hardware on an example system. In this example, three nodes (652-656) are included in an enterprise supercomputer. Each of the three nodes has four hyperthreads, a physical shared memory, and cache (i.e., each node is an embodiment of node 600 shown in FIG. 6A). A hyperthread on a given node (e.g., node 652) has a view that is the same as that shown in FIG. 6A. However, the hyper-kernel is aware of all of the resources on all of the nodes (i.e., the hyper-kernel sees twelve hyperthreads, and all of the physical shared memory). In the example shown in FIG. 6B, a given hyperthread (e.g., hyperthread 658, "H1-4") is labeled with its node number (e.g., "1") followed by a hyperthread number (e.g., "4").

Figure 7:
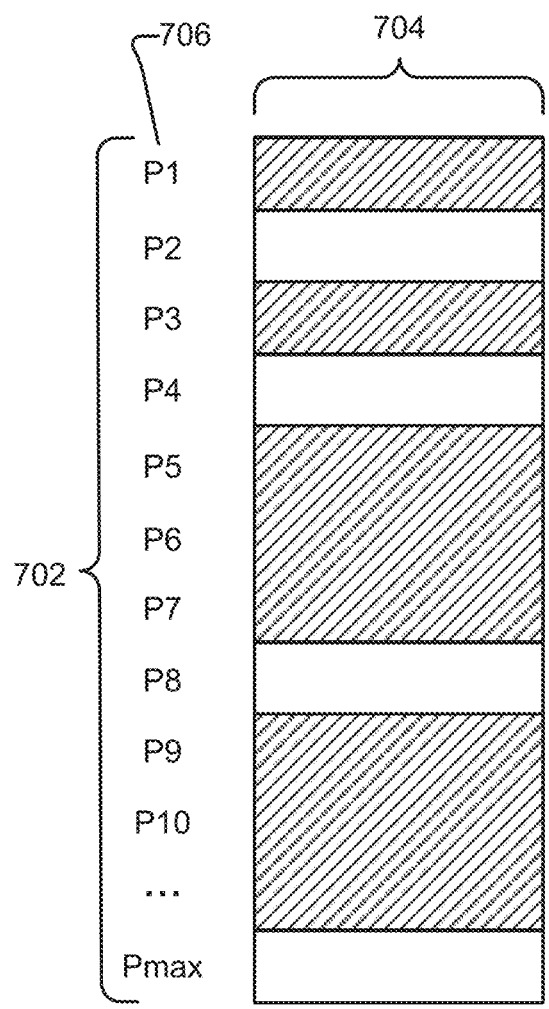
FIG. 7 depicts an example of an operating system's view of hardware on an example of an enterprise supercomputer system.

FIG. 7 depicts an example of an operating system's view of hardware on an example of an enterprise supercomputer system. The operating system sees a plurality of "virtualized processors" (also referred to herein as "virtual processors" and "VCPUs") denoted in FIG. 7 as P1 through Pmax (702). The virtualized processors correspond to the total number of hyperthreads across all nodes included in the enterprise supercomputer. Thus, using the example of FIG. 6B, if a total of twelve hyperthreads are present across three nodes, a total of twelve virtualized processors would be visible to an operating system running on the enterprise supercomputer. The operating system also sees "virtualized physical memory" (704) that appears to be a large, physical, linear memory of a size equal to the total amount of physical memory across all nodes.

As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state. As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state.

Resource Virtualization

Memory Virtualization

As explained above, in the physical configuration, each node has an array of memory addresses representing locations in memory. As such, in a physical configuration with three nodes (e.g., as depicted in FIG. 6B), there are three memory locations each of which has address 0x123456. In contrast, in the virtual configuration, all memory addresses are unique and represent the sum total of all memory contained in those three nodes. In the virtual configuration, all memory is shared, and all memory caches are coherent. In some embodiments, memory is further subdivided into a series of contiguous blocks, with monotonically increasing memory addresses. In the examples described herein, each page has 4K bytes of memory, however, other subdivisions can also be used, as applicable. The term "blocks" is used herein to describe contiguous arrays of memory locations. In some embodiments, the "blocks" are "pages."

Processor Virtualization

A virtual processor (e.g., virtual processor 706 of FIG. 7), as seen by the operating system, is implemented on a hyperthread in the physical configuration, but can be location independent. Thus, while the operating system thinks it has 500 processors running on a single physical server, in actuality it might have 5 nodes of 100 processors each. (Or, as is shown in FIG. 6B, the operating system will think it has twelve processors running on a single physical server.) The computation running on a virtual processor is described either by the physical configuration on a hyperthread when the computation is running, or in a "continuation," when the virtual processor is not running (i.e., the state of an interrupted or stalled computation).

As used herein, a "continuation" represents the state of a virtual processor. Each continuation:

Has processor state (i.e., saved registers, etc.).

Has a set of performance indicators that guide a scheduler object with information about how to intelligently assign continuations to leaf nodes (e.g., hyperthreads) for execution.

Has a virtual-processor identifier that indicates the processor the operating system thinks is the physical processor to which this continuation is assigned.

Has an event on which this continuation is waiting (possibly empty).

Has a state which includes: "waiting-for-event" or "ready."

I/O Virtualization

I/O systems observe a similar paradigm to processors and memory. Devices have a physical address in the physical configuration and virtual addresses in the virtual configuration. When migrating computations (described in more detail below), if for example, there are memory buffers associated with I/O operations, the I/O devices used will likely perform better if they are co-located with the memory with which they are associated, and can be moved accordingly.

Resource Maps

Resource maps are used to translate between virtual and physical configurations. The following are three types of resource maps used by enterprise supercomputers in various embodiments.

A "physical resource map" is a table that describes the physical resources that are available on each node. It contains, for example, the number and type of the processors on each node, the devices, the memory available and its range of physical addresses, etc. In some embodiments, this table is read-only and is fixed at boot time.

An "initial virtual resource map" is fixed prior to the booting of the operating system and describes the virtual resources that are available from the point of view of the operating system. The configuration is readable by the operating system. In some cases, it may be desirable to configure a system (from the viewpoint of the operating system) that does not match, one-to-one, with the underlying hardware resources. As one example, it may be desirable for the operating system to have more memory and fewer cores. This can be accomplished by changing the ratio of memory to cores, i.e., by modifying the initial virtual resource map.

A "current resource map" is created and maintained by each hyper-kernel instance. This map describes the current mapping between the virtual resource map and the physical resource map from the point of view of each node. For each entry in the virtual resource map, a definition of the physical resources currently assigned to the virtual resources is maintained. Initially (e.g., at boot time), the current resource map is a copy of the initial virtual resource map. The hyper-kernel modifies the current resource map over time as it observes the characteristics of the resource load and dynamically changes the mapping of physical resources to virtual resources (and vice-versa). For example, the definition of the location of the Ethernet controller eth27 in the virtualized machine may at different times refer to different hardware controllers. The current resource map is used by the hyper-kernel to dynamically modify the virtual hardware resource mappings, such as the virtual memory subsystem, as required.

Resource Migration Overview

Using the techniques described herein, virtualized resources, such as virtual general-purpose processors, virtual memory, virtual networks, and virtual disks can be migrated between physical locations. Virtual interrupts may also be remotely delivered. As explained above, the operating system is provided with information about the virtualized system, but that information need not agree with the physical system. As long as the basic hardware abstractions expected by the operating system are not violated, a virtual machine may look to the operating system just like a physical machine.

As described above, in the example software-defined server described herein, there is an identical instance of the hyper-kernel running on each node of the cluster that the virtual machine spans.

Due to physical hardware boundaries, a physical processor cannot directly address every guest physical address. When a guest physical address needs to be read or written, it is translated into a physical address that the physical processor can access.

In one embodiment, this is handled through the physical processor's second level page tables. When software makes a reference to a guest (virtual) physical address, if the page of memory containing that address is resident on the node that has the processor that generated that address, the address is represented in the second level page table. Automatic address translation hardware will then translate that address to a guest physical address and then to a real physical address as it normally does by using the first and second level page tables, with no performance degradation. However, if the memory address is not present in the second level page table, the hardware cannot completely translate that guest address to a real physical address, and the processor generates an interrupt. The hyper-kernel fields that interrupt and analyzes the request (similar to what an operating system might do when it needs to copy a page that is not memory-resident but is only resident on a backing store). This analysis may result in a request for that page to be sent (migrated) to the node from a different node, or it may result in a decision to migrate that virtual processor to the node that has that page of memory. Page reads and writes may be handled differently. For example, readable pages may be replicated, but a writable page requires additional overhead to remove that page from the L4 cache of other nodes that may have a copy (i.e., invalidation).

In one embodiment, to migrate a virtual processor, the hyper-kernel takes a snapshot of the state of the processor (e.g., a continuation, using 6400 bytes of data, or any other amount as appropriate) and sends it in a message over the dedicated interconnect (e.g., Ethernet) to the chosen destination, where the suspended virtual processor may be restored onto another physical processor (e.g., implemented as a hyperthread of a processor core) at the destination node. Saving and restoring processor state may be implemented using mechanisms provided for processors supporting virtualization. Since the program counter has not advanced, the instruction is then restarted. Since the page and the virtual processor are now co-resident, the virtual processor continues running. It is possible that in some cases the instruction generates additional interrupts to access different non-resident pages, but the mechanism that is used may be the same. When the virtual processor migrates, its updated location is recorded (e.g., in the resource maps described above). However, for reliability, perfect location knowledge is not assumed, as the virtual processor may have subsequently re-migrated.

In the following example of resource migration, suppose an enterprise supercomputer holds a large in-memory database, larger than can fit into a single node. Part of the database is in a first node, "node1." Suppose one of the cores on a different node, "node2," is trying to access data that is owned by node1 and that does not reside locally in a cache on node2. The core on node2 will receive a memory access violation because it is trying to access data that it believes it should be able to access (but cannot). As will be described in more detail below, the exception is handled in the hyper-kernel.

One way that the situation can be resolved is by moving the needed area of memory to node2, and then returning control back to the operating system (which, in turn, returns it back to the database system). The software can then proceed as intended (i.e., as if the access violation never occurred).

In many cases, there may be one or more other cores in other nodes (e.g., "node3") that are also trying to access the same area block of memory as needed by node2 above. Node3 might be attempting to access the same data, or it might be accessing different data contained in the memory that was moved (also referred to as "false sharing"). The data could be moved to node3, but if the core on node2 asks for the data a second time, the data would need to be moved back to node2 (i.e., potentially moving the data back and forth repeatedly), which can be slow and wasteful. One way to avoid moving data back and forth between cores is to recognize that both cores and the associated block of data should be co-located. Using the techniques described herein, the memory and the computation can be migrated so that they reside on the same node. Doing so will result in a higher likelihood of faster access to data, and a higher probability of sharing data stored in local caches.

When the access violation occurs, an event is triggered (in a system dependent way) to which the hyper-kernel responds. One example of how such an event can be handled is by the invocation of a panic routine. Other approaches can also be used, as applicable. As will be described in more detail below, the hyper-kernel examines the cause of the event and determines an appropriate strategy (e.g., low level transaction) for handling the event. As explained above, one way to handle the event is for one or more blocks of hyper-kernel virtualized memory to be transferred from one node's memory to another node's memory. The transfer would then be initiated, and the corresponding resource maps would be updated. A continuation would be built poised to be placed in a local table in shared memory, referred to herein as an "event table," so that the next thing the continuation does when it is resumed would be to return control to the operating system after the transfer is completed. Alternatively, a decision could be made to move the virtual processor to the node that contains the memory being requested or to move the virtualized memory (and its virtualized memory address) from one node to another. Different decisions for how to handle the stall may be based on the characteristics or context or cause of the stalling event. In various embodiments, the hyper-kernel makes three decisions when handling an event: which (virtual) resources should move, when to move them, and to where (in terms of physical locations) they should move.

Tidal Tree

The physical hierarchical structure depicted in FIG. 2 has an analogous software hierarchy comprising a set of "scheduler objects" (i.e., data structures), each of which has a set of characteristics described below. The scheduler objects form a "TidalTree," which is an in-memory tree data structure in which each node of the tree is a scheduler object. Each scheduler object corresponds to an element of the physical structure of the supercomputer (but not necessarily vice versa), so there is one node for the entire machine (e.g., node 100 as shown in FIG. 2), one node for each physical node of the system (e.g., node 102 as shown in FIG. 2), one node for each multicore socket on the physical nodes that comprise the entire machine (e.g., node 202 as shown in FIG. 2), one node for each core of each socket (e.g., node 210 as shown in FIG. 2), and one node for each hyperthread on that core (e.g., node 232 as shown in FIG. 2).

Each scheduler object s:
Is associated with a physical component (e.g., rack, blade, socket, core, hyperthread).
Except for the root of the tree, has a parent scheduler object which is partly responsible for directing its operations (as explained in more detail below).
Has a set of children each of which is a scheduler object. This is the null set for a leaf (e.g., hyperthread) node. As explained in more detail below, it is the responsibility of a scheduler object s to manage and assign (or re-assign) work to its children, and indirectly to its grandchildren, etc. (i.e., s manages all nodes in the subtree rooted at s).
Has a work queue, which is a set of continuations (as described earlier).
Has a (possibly empty) set of I/O devices that it also has the responsibility to manage and assign (or re-assign) work.

Each node can potentially be associated with a layer of some form of cache memory. Cache hierarchy follows the hierarchy of the tree in the sense that the higher the scheduler object is, the slower it will usually be for computations to efficiently utilize caches at the corresponding level of hierarchy. The cache of a scheduler object corresponding to a physical node can be a cache of memory corresponding to that node. The memory on the physical node can be thought of as a cache of the memory of the virtual machine.

Resource Migration—Additional Information

The hyper-kernel simulates part of the virtual hardware on which the virtual configuration resides. It is an event-driven architecture, fielding not only translated physical hardware events, but soft events, such as receipt of inter-node hyper-kernel messages generated by hyper-kernel code running on other nodes.

As explained above, when an interrupt event significant to the hyper-kernel occurs, the hyper-kernel makes a decision of how to respond to the interrupt. Before control is returned to the operating system, any higher priority interrupts are recognized and appropriate actions are taken. Also as explained above, the hyper-kernel can make three separate decisions: (1) which resources to migrate upon certain events, (2) when to migrate them, and (3) to where those resources should move.

In the following example, suppose a scheduler object "s" in a virtual machine is in steady state. Each scheduler object corresponding to a physical node has a set of physical processor sockets assigned to it. Hyperthreads in these sockets may or may not be busy. The physical node also has some fixed amount of main memory and a set of I/O devices, including some network devices. Scheduler object s, when corresponding to a node, is also responsible for managing the networks and other I/O devices assigned to nodes in the subtree rooted at s. The following is a description of how resources can migrate upon either synchronous or asynchronous events.

Migrations Triggered by Synchronous Events

In the following example, suppose there exists a leaf node scheduler object s, and virtual processor p assigned to s. Leaf node schedule object s is assumed to be executing an application or operating system code on behalf of an application. Assuming the leaf node is not in an infinite loop, p will eventually run out of work to do (i.e., stall) for some reason (e.g., waiting for completion of an I/O operation, page fault, etc.). Instead of allowing p to actually stall, the hyper-kernel decides whether to move the information about the stalled computation to some other node, making one of that other node's processors "responsible" for the stalled continuation, or to keep the "responsibility" of the stalled computation on the node and instead move the relevant resources to the current node.

The stall is thus handled in either of two ways: either the computation is moved to the physical node that currently has the resource, or else the resource is moved to the physical node that has requested the resource. Example pseudo code for the handling of a stall is provided below (as the "OnStall" routine) in the "EXAMPLE ROUTINES" section below.

Decisions such as how to handle a stall can be dependent on many things, such as the order of arrival of events, the state of the computation running on the virtual machine, the state of the caches, the load on the system or node, and many other things. Decisions are made dynamically, i.e., based on the best information available at any given point in time.

Recording Stalled Computations

Stalled computations are recorded in a data structure referred to as a "continuation." A continuation has a status that can be, for example, "waiting-for-event" or "ready." A stalled computation gets recorded as a newly created continuation with status "waiting-for-event." Once the reason for stalling is satisfied (e.g., due to detection of the event), the status of the corresponding continuation is changed to "ready." Each continuation with status "ready" is stored in a "wait queue" of a scheduler object so that eventually it gets scheduled for execution. In contrast, any continuation with status "waiting-for-event" will not be stored in any scheduler object's wait queue. Instead, it is stored in the local shared memory of the physical node where the hardware event that stalled the corresponding computation is expected to occur, such as receipt of a missing resource.

Additionally, the newly created continuation is associated with the stalling event that caused its creation. This mapping between (stalling) events and continuations awaiting these events permits fast dispatch of asynchronous events (see the "handleEvent" described below). The mapping between continuations and events is stored in a table called "event table" and is kept in the shared memory of the corresponding physical node. Each physical node has its own event table, and an event table of a physical node is directly addressable by every core on that physical node. All anticipated events recorded in an event table of a physical node correspond to hardware events that can occur on that physical node. The scheduler object s mapped to a physical node n represents n, and the event table of n is associated with s. In some cases, several continuations may be waiting on the same event, and so some disambiguation may be required when the event is triggered.

Continuations are built using the "InitContinuation" routine. If a decision is made to move the computation, the remote physical node holding the resource will build a continuation that corresponds to the stalled computation and will store it in the remote physical node's event table. When that continuation resumes, the resource will be available. In effect, the hyper-kernel has transferred the virtual processor to a different node.

In the case where a decision is made to move the resource, the node that has experienced the stall requests the transfer of the resource and builds a continuation using InitContinuation and stores it in the local event table. Upon receipt of the resource, the continuation is attached to an appropriate node in the TidalTree, and when that continuation is resumed, the resource will be generally be available and visible. In effect, the virtual resource has been transferred to the node that requested it.

Note that by placing continuations in event tables, it is guaranteed that the processor that receives the event will quickly find the related continuations in its local event table. The reason for the stall in the computation will have been satisfied.

Having dealt with the stall, the virtual-processor p will in effect be suspended. In between processing the stall and finding a new continuation to resume, p becomes an "anonymous shadow processor," i.e., a processor with no identity known to the operating system. This shadow processor then looks for a new continuation to resume. An example of this is shown below in the "assignProcessor" routine described in more detail below.

Notation

Let e be the event that stalled virtual processor p. Assume that e is triggered by local hardware of some physical node n. In particular, assume r is the resource, which caused the stalling event to occur. Resource r could be a block of memory, or an I/O operation, or a network operation. Assume that p is assigned to scheduler object s, which belongs to the subtree rooted at the scheduler object that represents physical node n.

On-Stall

The following are example details regarding an "on-stall" routine. The migration-continuation function returns true if and only if processor p in node n decides that the resource should not move, i.e., the computation should move. This can be determined by a number of factors such as history and frequency of movement of r between nodes, the type of r, the cost of movement, the number of events in n's local event table waiting for r, system load, etc. For example, it may not be desirable to move a resource if there is a continuation stored in n's local event table that is waiting for it.

A variety of patterns of events that would benefit from migrations exist. One approach to describing these patterns of events, like access violations, is in formal language theory. Regular (i.e., Chomsky type-3) languages can be recognized by finite state automata. In addition, using a compact and flexible notation, a description of the events that are observed can be made as sentences (or Chomsky sequences) in the regular language, and the recognition modeled as state transitions in the corresponding finite state automaton. When the full Chomsky sequence of events is seen, migration-continuation gets evaluated accordingly: if the finite state automaton accepts the Chomsky sequence, the condition is met, otherwise, it is not met. The length of the minimized finite state machine defines the amount of history that needs to be kept.

In various embodiments, all events happen locally, and the hyper-kernel on the physical node receiving the event must handle it—truly synchronous events are not assumed to occur between physical nodes. To coordinate migration strategy between nodes, "messages" are used. Message "sends" are synchronous from a node's point of view, but message "receives" are asynchronous, in that a processor or shadow processor, in general, does not wait for receipt of a message. When messages arrive, they are dealt with by the hyper-kernel as a virtual interrupt. In one embodiment, the hyper-kernel will not allow a processor to resume a continuation while there are messages waiting to be handled. Therefore, before control is transferred back to the operating system, the queue is checked, and any messages are dealt with prior to the transfer of control back to the operating system.

For scheduler object s and continuation c, a cost function cost(s,c) can be used to guide the search up the tree. If multiple ancestors of p have non-empty queues, then p may not want to stop its search at the first ancestor found with a nonempty wait queue. Depending on the metrics used in the optimizing strategy, p's choice may not only depend on the distance between p and its chosen ancestor but on other parameters such as length of the wait queues.

A function, find-best-within(s), can be used to return the "best-fit" continuation in a (non-empty) wait queue of a scheduler object. Examples of parameters that can be considered include:

1. Position in the queue
2. The relationship between p and the last location recorded in the continuation (the closer those locations are the better it may be for reusing cache entries).
3. Performance indicators recorded in the continuations in the queue.

The cost and find-best-within functions can be customized as applicable within a given system.

Migrations Triggered by Asynchronous Events

Examples of asynchronous events include: receipt of a packet, completion of an I/O transfer, receipt of a resource, receipt of a message requesting a resource, etc. Generally, a hyper-kernel that receives an event corresponding to a hardware device managed by the operating system needs to deliver a continuation associated with that event to a scheduler object s. By doing so, s will make this continuation available to an appropriate scheduler object and then ultimately to the computation managed by the operating system represented by that continuation. If, on the other hand, the event is the receipt of a message from a hyper-kernel on another physical node, the hyper-kernel can handle it directly.

To simplify explanation, in the examples described herein, an assumption is made that there is only one continuation associated with an event. The procedures described herein can be generalized for the case where multiple continuations are associated with the same event, as needed.

In some embodiments, the search for a scheduler object on which to place the continuation starts at the leaf of the tree that built the continuation and then proceeds upward (if the computation previously executed on this node). By doing so, the likelihood of reusing cache entries is increased.

Handle-Event

Pseudo code for an example handle-event routine is provided below in the "EXAMPLE ROUTINES" section. The cost function, cost(s,c), is a function that helps determine the suitability of assigning c to scheduling object s. The cost function can depend on a variety of parameters such as the size of the wait queues, the node traversal distance between s and the original scheduling node for c (to increase the probability that cache entries will be reused), and the history of the virtual processor, the physical-processor, and the continuation. If the wait queues of the scheduler objects close to s already contain too many continuations, then it may take a relatively longer time until any newly added continuation is scheduled for execution. Example conditions contributing to cost(s,c) are described below, and the conditions can be customized as applicable.

Costs

Cost functions are used to evaluate options when selecting continuations and scheduling objects. Cost functions can be expressed as the summation of a sum of weighted factors:

$$\text{cost} = w_1 f_1^{x_1} + w_2 f_2^{x_2} + \ldots + w_n f_n^{x_n},$$

where $w_i$ indicates the importance of the corresponding factor and $x_i$ indicates an exponential.

Examples of factors $f_i$ are listed for each of the costs below. Weights $w_i$ and exponents $x_i$ can be determined in a variety of ways, such as empirically and by simulation. Initial weights and exponents can be tuned to various application needs, and can be adjusted by an administrator to increase performance. The weights can be adjusted while the system is active, and changing weights does not change the semantics of the hyper-kernel, only the operational performance characteristics.

Examples of the factors that can be considered include:
Length of time since the last processor evacuated this scheduler object.
Height of the scheduler object in the TidalTree.
Length of the work queue.
Reservation status (i.e., it may be the case that some application has reserved this resource for a specific reason).
Node specification (i.e., the node itself might have been taken out of service, or is problematic, has in some way a specialized function, etc.).
Age of the continuation in the queue.
Last physical processor to run this continuation.
Last virtual processor to run this continuation.
Node on which this continuation was last executing.

The "temperature" of the cache. (A cache is "warm" when it has entries that are likely to be reused. A cache is "cold" when it is unlikely to have reusable cache entries.)
Group membership of the continuation (i.e., the continuation may be part of a computation group, each element of which has some affinity for other members of the group).
Performance Indicators (Hints) and special requirements.

EXAMPLES

"OnStall" and "assignProcessor"

Figure 8:
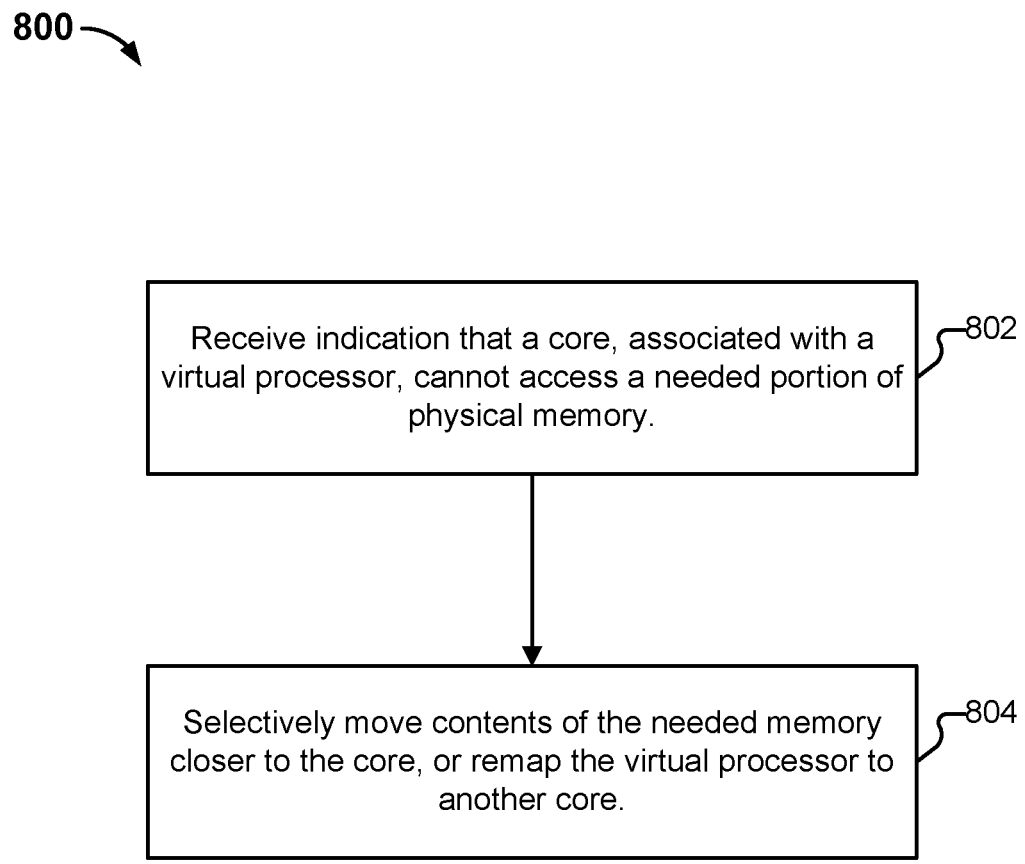
FIG. 8 illustrates an embodiment of a process for selectively migrating resources.

FIG. 8 illustrates an embodiment of a process for selectively migrating resources. In some embodiments, process 800 is performed by a hyper-kernel, such as in conjunction with the OnStall routine. The process begins at 802 when an indication is received that a core (or hyperthread included in a core, depending on whether the processor chip supports hyperthreads) is blocked. As one example, suppose a hyperthread receives a request, directly or indirectly, for a resource that the hyperthread is not able to access (e.g., RAM that is located on a different node than the node which holds the hyperthread). When the hyperthread fails to access the resource (i.e., an access violation occurs), an interrupt occurs, which is intercepted, caught, or otherwise received by the hyper-kernel at 802. In particular, the hyper-kernel receives an indication at 802 that the hyperthread is blocked (because it cannot access a resource that it has been instructed to provide). In addition to reporting its blocked state, the hyperthread provides information such as the memory address it was instructed to access and what type of access was attempted (e.g., read, write, or modify).

At 804, the hyper-kernel determines whether the needed memory should be moved (e.g., to the node on which the blocked hyperthread is located), or whether the requesting process should be remapped (i.e., the virtual processor should be transferred to a different node). The decision can be based on a variety of factors, such as where the needed memory is located, the temperature of the cache, the workload on the node holding the hyperthread, and the workload on the node holding the needed memory (e.g., overworked or underworked). In some embodiments, the workload of a node is determined based at least in part on the average queue length in the TidalTree.

If the hyper-kernel determines that the memory should be moved, the hyper-kernel uses its current resource map to determine which node is likely to hold the needed memory and sends a message to that node, requesting the resource. The hyper-kernel also creates a continuation and places it in its event table. The hyperthread that was blocked at 802 is thus freed to take on other work, and can be assigned to another virtual processor using the assignProcessor routine.

The hyper-kernel checks its message queue on a high-priority basis. When the hyper-kernel receives a message from the node it contacted (i.e., the "first contacted node"), in some embodiments, one of two responses will be received. The response might indicate that the first contacted node has the needed resource (and provide the resource). Alternatively, the message might indicate that the contacted node no longer has the resource (e.g., because the node provided the resource to a different node). In the latter situation, the first contacted node will provide the identity of the node to which it sent the resource (i.e., the "second node"), and the hyper-kernel can send a second message requesting the resource—this time to the second node. In various embodiments, if the second node reports to the hyper-kernel that it too no longer has the resource (e.g., has provided it to a third node), the hyper-kernel may opt to send the continuation to the third node, rather than continuing to request the resource. Other thresholds can be used in determining whether to send the continuation or continuing the resource (e.g., four attempts). Further, a variety of criteria can be used in determining whether to request the resource or send the continuation (e.g., in accordance with a cost function).

In the event the hyper-kernel determines that the continuation should be transferred (i.e., that the computation should be sent to another node rather than receiving the resource locally), the hyper-kernel provides the remote node (i.e., the one with the needed resource) with information that the remote node can use to build a continuation in its own physical address space. If the remote node (i.e., the one receiving the continuation) has all of the resources it needs (i.e., is in possession of the resource that caused the initial access violation), the continuation need not be placed into the remote node's event table, but can instead be placed in its TidalTree. If the remote node needs additional resources to handle the continuation, the received continuation is placed in the remote node's event table.

Figure 9:
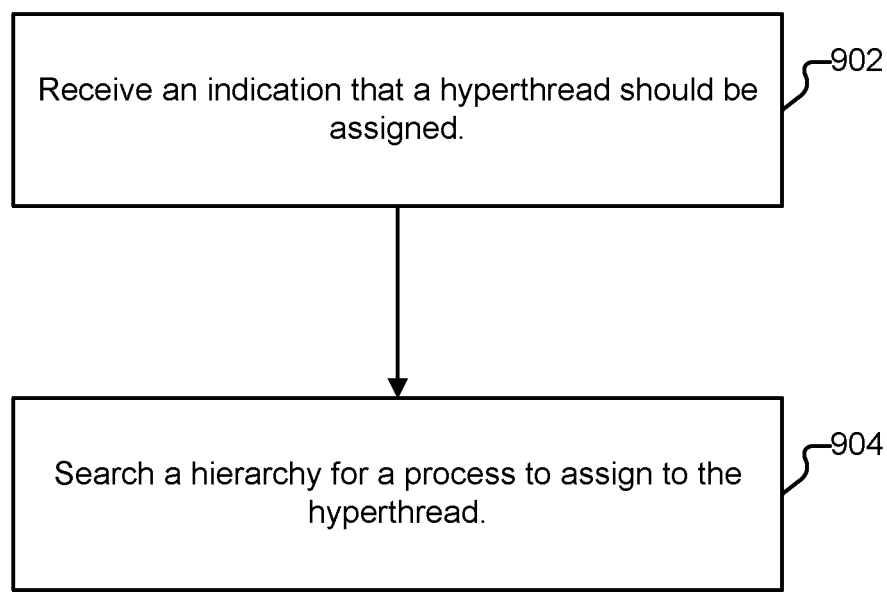
FIG. 9 illustrates an embodiment of a process for performing hierarchical dynamic scheduling.

FIG. 9 illustrates an embodiment of a process for performing hierarchical dynamic scheduling. In some embodiments, process 900 is performed by a hyper-kernel, such as in conjunction with the assignProcessor routine. The process begins at 902 when an indication is received that a hyperthread should be assigned. Process 900 can be invoked in multiple ways. As one example, process 900 can be invoked when a hyperthread is available (i.e., has no current work to do). This can occur, for example, when the hyper-kernel determines (e.g., at 804) that a continuation should be made. The previously blocked hyperthread will become available because it is no longer responsible for handling the computation on which it blocked (i.e., the hyperthread becomes an "anonymous shadow processor"). As a second example, process 900 can be invoked when a message is received (e.g., by the hyper-kernel) that a previously unavailable resource is now available. The hyper-kernel will need to locate a hyperthread to resume the computation that needed the resource. Note that the hyperthread that was originally blocked by the lack of a resource need not be the one that resumes the computation once the resource is received.

At 904, the TidalTree is searched for continuations that are ready to run, and one is selected for the hyperthread to resume. In various embodiments, the TidalTree is searched from the leaf-level, upward, and a cost function is used to determine which continuation to assign to the hyperthread. As one example, when a hyperthread becomes available, the continuation that has been queued for the longest amount of time could be assigned. If no continuations are waiting at the leaf level, or are outside a threshold specified by a cost function, a search will be performed up the TidalTree (e.g., the core level, then the socket level, and then the node level) for an appropriate continuation to assign to the hyperthread. If no appropriate continuations are found for the hyperthread to resume at the node level, the hyper-kernel for that node contacts the root. One typical reason for no continuations to be found at the node level is that there is not enough work for that node to be fully utilized. In some embodiments, the node or a subset of the node can enter an energy conserving state.

Guest Thread Overview

In the above, various embodiments were described in which it is shown how to create, manage, and optimize an instance of a virtual server (or computer) which is distributed over a tightly interconnected set of physical servers (or computers).

In order to make such a system run efficiently, sets of guest physical processors (virtualized processors) are associated with sets of virtual pages of memory (guest pages of memory which the guest operating system believes to be physical pages), so that they may be co-located across a set of computers (e.g., nodes in a cluster). When co-located, virtualization hardware in microprocessors may be used to achieve a performance level consistent with hardware-based non-virtualized servers.

The pattern of page accesses by VCPUs to sets of guest physical memory pages is defined by a combination of the application programs, operating system, networks, real time events, I/O devices, etc., and does not substantially change if executed on a virtualized server.

Modern operating systems such as Linux, FreeBSD, Windows, and Mac OS provide a set of features to implement asynchronous control structures referred to as "threads." Threads are software structures and mechanisms in an operating system or a run-time library (or both) that allow for asynchronous and parallel program behavior, often including responses to asynchronous events. Threads allow sub-programs to run different streams of instructions with different patterns of data access at different times. In the examples described herein, threads may be bound to a set of virtual processors under control of a scheduler running in a guest operating system. At any given point in time, a thread (e.g., guest thread associated with an application running on the guest operating system) is running on a VCPU or not running at all. At a later time, the scheduler may decide to run the thread on what it believes to be a different physical processor (which is in fact, a different virtual processor).

As described above, VCPUs in a virtualized environment may be bound to true (also called "host") physical processors through the implementation of the virtual machine and the virtual machine's scheduler (which may be different from the guest operating system scheduler).

Modern operating systems and hardware may often provide information to the hardware or the virtualization system about which thread is running in which VCPU at any given point in time, directly or indirectly.

An assumption is made by an operating system that it has direct and fast access to all resources (e.g., memory, I/O, networks, etc.) of the system. In a single virtual machine spanning a set of nodes built using the techniques described herein, this assumption is semantically preserved, but the physical realization may not be true. For example, there may be virtual processors (or threads) accessing non-local resources, where this non-local access is neither direct nor fast. As described above, when the virtualization system observes an event generated by the guest that is not physically realizable, a stall is generated. The virtualization system operates to correct or otherwise address the situation that caused the stall to bring it in line with the semantic behavior expected by the guest (application or operating system). The performance of the virtualized system is governed by the base performance of the guest operating system or application, but may be degraded by the number of stalls, and the total time taken to make the stall semantically accurate.

The pattern of access of virtual processors and sets of memory pages is in actuality determined by a guest thread running in a virtual processor under the control of a guest operating system scheduler. That is, when a virtual processor stalls, it is due to a portion of memory, referenced by the thread running in the VCPU, being inaccessible. Guest threads may run in different virtual processors, and hence host physical processors, at different times. VCPUs, and hence host physical processors, may run the same guest thread at different points in time.

The binding of threads to host physical processors depends on a variety of factors, which may include the programmed behavior of the guest scheduler, computations performed by the thread, a pattern of external asynchronous events (such as the arrival of a network packet), arrival of an I/O interrupt, etc. These events, and therefore the pattern of event arrival and the binding of the guest thread to a guest physical processor, may not be predictable in advance. Thus the actual behavior of the system may be non-deterministic, even if the program running is deterministic.

It may not be known by the hyper-kernel a priori which thread is running in which VCPU by inspection of the thread, since this is under the control of the guest operating system or a guest runtime library. For example, the guest operating system may perform thread context switching, where the operating system switches, moves, or multiplexes guest threads into different VCPUs. When the switch occurs, because the guest operating system doesn't know about the hyper-kernel, this may cause the thread to be moved away from its working set, resulting in stalls.

In some embodiments, based on the observation by the hyper-kernel of guest thread behavior and the pages of memory that they access, threads may be kept together along with the appropriate set of pages of virtual memory (guest physical memory), also referred to as the thread's "working set," on the same node, as much as possible. By doing so, the number and frequency of stalls due to non-local access may be reduced, and a performance level comparable to a real physical computer may be achieved. Further, the overhead (e.g., the product of the number of stalls and the average time per stall) may be reduced. This may be achieved by intelligently placing pages and threads where they will most likely not stall. The number of page transfers and page migrations may also be minimized.

Cache Coherency Protocol

An example embodiment of a cache coherency protocol that may be used with a computing system such as the software defined server described herein is described as follows.

Pages on any node can be valid, or invalid. The validity/invalidity of a page refers to whether an entry to that page exists in some page table on a node. If they are valid, they correspond to an address that the guest operating system perceives to be a physical address, but is in reality a virtual guest physical address when viewed by the hyper-kernel.

A valid page p resident on a node n may be in one of several states: Prime (or primary), or Exclusive or Secondary.

1. If p is marked Prime, it is "read-only" and n is said to "own" p.

2. Nodes other than n may have copies of p, which are marked or called Secondaries. In some embodiments, if there is a secondary, it can be validly assumed that there is a prime somewhere else in the software defined server. Similarly, if a node has a prime page, then it can be assumed that there are secondaries of the page elsewhere in the software defined server. In some embodiments, the number of secondaries is maximized so that when attempts to read those pages are made, the page data is already resident on the requesting node, minimizing time spent accessing the page data.

One example of where a secondary may be desired is when handling a set of pages that hold the code of an operating system (e.g., guest operating system). Because the code for the operating system is constant and does not change, it would be inefficient if the processors running the operating system were to fetch pages for the operating system (as this may result in a stall while the processor is waiting for the requested page). Instead, to improve efficiency and reduce stalls, secondaries can be used, where as many pages of the operating system are replicated as possible. By reducing stalls, overhead in the system is also reduced, leading to increased efficiency of the system.

Similar optimizations and efficiencies can be performed for other kinds of programs, such as those with read-only data (where pages of the read-only data are copied as secondaries to read only nodes). In some embodiments, no distinction is made between code pages of an operating system or an application that are read-only pages of memory.

As another example, secondaries can be used that have large amounts of data that do not change very often. If the memory is available to do so, as much of the read-only data can be replicated as possible to improve efficiency and reduce stalls.

3. If p is marked Exclusive on n, the page can only exist on n, there can be no other copies, and the page can be read and written into ("read-write"). In this case, there are no secondaries for p.

In some embodiments, before a page is made exclusive, an invalidation operation is performed to invalidate all other existing copies of the page. This can be used to guarantee evaluation order in existing architectures. The invalidation operation can be performed by sending out messages to all other nodes, requesting that they invalidate their copy of the page. When responses (e.g., acknowledgments) to those requests are received, the receipt of all those responses indicates that there are no other locations at which the page exists. The guest operating system can then start up again and write to the page. When the write is completed, other pages may want to have a copy of the page, and in some embodiments, a snapshot of the page can be taken and used to create new secondaries that have the updated information for the page. Thus, through the use of secondaries, it will appear to the guest operating system that the pages are local.

When a vcpu on a node m (m≠n) requests access to p from n, if that page is Prime or Exclusive, the page p currently on n is marked Invalid, and a copy of the page is then sent to m which marks p as Prime. In some embodiments, as an optimization, the vcpu on node m may mark the page p as Exclusive if the vcpu on node m knows that is what is needed.

In some embodiments, if a node has a page that is prime or exclusive, then when it receives a request to send prime or exclusive writes to that page it is converted on that node to a secondary. The right to write into that page is then transferred to the node that is requesting the page. This is an optimization that may be performed based on an assumption that the node would not be requesting the page unless the node were going to write to the page. This saves a transaction in the protocol having to be performed, increasing efficiency.

In some embodiments, if node m requests access to p from n, then node n marks its copy of p as secondary. The page p is then sent to node m. If node m marks its copy of p as exclusive or prime, then node n's copy of page p is invalidated.

In some embodiments, if a page p on node n is Prime, and is to be written into, all secondary copies must be made invalid, and only after receiving an acknowledgement that this has been accomplished, n marks p as Exclusive. For example, in some embodiments, the page cannot be written into until it is known that node n is the sole writer—that is, the page cannot be written into until the page is in the exclusive state, where the page cannot be in the exclusive state until all acknowledgments have been received indicating that there are no other secondaries (i.e., all secondaries have been invalidated). In some example implementations, this can be optimized. For example, the node that is primary for this page can initiate the invalidations. In some embodiments, the invalidations include instructions that the acknowledgements should be sent to the requestor (who is about to become primary) NOT to the current primary. In some embodiments, the requester must collect all the acknowledgements before the page can be accessed. In this way, the invalidations can proceed safely in parallel with the transfer of the page. In summary, in this example optimization, the primary initiates the invalidations, but the requestor completes the invalidation process.

The following are additional details regarding invalidations. In some embodiments, the software defined server includes first level page tables, which perform hardware translation from the user space (e.g., guest program run in user space) to what the guest operating system believes is its physical space (i.e., the first level page table mapping translates virtual addresses into what the guest OS believes to be physical addresses). As described above, what the guest OS believes to be physical addresses are guest physical addresses managed by the hyper-kernel (e.g., hyper-kernel host addresses), which then go through another level of page address translation, in hardware (e.g., via a second level page table), where the guest physical addresses are converted or translated into true physical addresses of the pages. In some embodiments, a page is invalidated by erasing it from the second level page table. Garbage collection can then be run, or memory can be returned to a free pool, etc., as the nodes can no longer access the invalidated page of memory.

After this, all write operations to a page marked Exclusive will not generate any stalls, since they can be locally read and written into on the node, and no other copies exist (e.g., pages invalidated by erasing them from the second level page table, as described above).

Distributed I/O Virtualization

In a distributed virtualized environment with a single virtual machine spanning a multi-server computing architecture, the physical resources involved in implementing an I/O transfer may be remote from each other. For example, the physical processor that received the request to perform the I/O transfer, the I/O device to be used to perform the I/O transfer, and physical memory involved in the transfer may all be on separate or remote nodes of the computing system. This is in contrast to existing virtualization implementations such as those provided by VMware and KVM, in which multiple virtual machines are supported by a single machine, and thus, the physical resources of the single machine are local to each other.

The distributed nature of the physical resources introduces challenges to the handling of I/O requests. One example of a challenge is efficiently notifying an I/O device of an I/O request when the I/O request is received by a physical processor on a node that is different from the node that has the I/O device. Another example challenge is efficiently moving data or pages of memory involved in the I/O operation to and from the node with the I/O device (since the I/O device will need to access the data and/or the portions of physical memory to execute the I/O operation), since the data/pages of physical memory may be scattered throughout the cluster, where the movement of data and portions of physical memory across the cluster may introduce processing and networking overhead. Another example challenge is in notifying the guest operating system of completion of the I/O device. As another example challenge, most I/O activity is asynchronous to VCPU execution, and any stalling of the VCPUs disrupts guest execution performance (the fewer the stalls, the closer to bare metal performance is achieved).

Described herein are techniques for implementing distributed I/O virtualization in a distributed virtualized environment such as that described herein. The techniques described herein address challenges such as those described above, and include data movement mechanisms that provide flexibility on how pages are delivered on read and how pages are extracted on a write, which have various benefits, such as saving time, preventing guest pages from being locked to a node for more time than needed (e.g., to rewrite pointers), etc. The techniques for distributed I/O virtualization are efficient in minimizing the resource overhead (e.g., processor overhead, network bandwidth overhead, etc.) needed to communicate data involved in implementing the I/O operation.

As another example benefit, using the techniques described herein, the system does not need to wait for some request for reads/writes to complete before an application thread can continue. Block on completion may be deferred until a later time. This addresses the aforementioned issue of stalling of VCPUs (which disrupts guest execution performance), where most I/O activity is asynchronous to VCPU execution.

Other examples of benefits achieved by using the techniques described herein include avoiding VCPU migration and page stalls. VCPU migration may be expensive as additional pages may be transferred over along with the VCPU state. Further, migration of a VCPU may potentially cause other VCPUs to be migrated as well, interrupting guest operation. Another example of a benefit achieved by using the techniques described herein includes minimizing statefulness, such that a minimum amount of progress is tracked to allow efficient migration of I/O device emulation. Further, the number of messages that need to be communicated across the interconnect is minimized. Further, the techniques described herein provide other performance benefits, such as improved network interface throughput on a local node, as well as improved throughput when issuing a remote I/O operation, where, for example, the memory involved in the I/O operation may not be contiguous (where the memory is then chained together so that when the I/O request is being satisfied, the contents are placed in these non-contiguous blocks of memory).

In one embodiment, the distributed I/O virtualization is handled by a distributed I/O subsystem that is a part of the distributed hyper-kernel described above. Each node in the cluster has a per-node hyper-kernel, which includes a per-node I/O emulation subsystem. The various per-node I/O emulation subsystems communicate and coordinate with each other to implement an I/O request issued from the guest operating system.

I/O devices include block I/O devices (e.g., disks of storage), network I/O devices (e.g., network interface controllers (NICs), and others). Examples of I/O transfers involving block I/O devices include the writing of data to block devices, as well as the reading of data from block devices. Examples of I/O transfers involving network I/O devices include the transmission of data over a network by network devices, as well as the receipt of data over a network using network devices. Various examples involving distributed versions of such block and network device emulations will be described herein for illustrative purposes.

Request Notifications

When a guest operating system requests a virtual I/O device to perform some work on behalf of the guest, the guest writes a set of descriptors to addresses of guest physical memory. The guest physical addresses may be mapped to portions of real physical memory that are on any node in the cluster (or the real pages of physical memory may not even have been allocated yet). The descriptors include data structures that describe the I/O work to be performed. In one embodiment, the hyper-kernel emulates block and network devices. In some embodiments, these emulations acquire command chains containing descriptors from queues in guest memory, and translate those commands into block and network level commands (to drive a physical I/O device).

For example, in the case of writing data to a virtual I/O block device (e.g., writing the contents of a set of pages of guest physical memory to the I/O device at a set of blocks of the device), the descriptor includes, in various embodiments, an identifier of the virtual I/O device to be written to, a set of identifiers of the blocks to be written to, as well as a set of guest physical addresses whose contents are to be written to each of those blocks. If multiple blocks are to be written to, then each block is associated with a corresponding descriptor, and a chain of descriptors is formed.

In the case of reading data from a virtual I/O block device (e.g., to read a set of blocks from disk into a set of pages of guest physical memory at a set of guest physical addresses), the descriptor includes, in various embodiments, an identifier of the virtual I/O device to be read from, a set of identifiers of the blocks to be read from, as well as a set of guest physical addresses whose contents are to be overwritten with the data read from the virtual I/O device.

In the case of transmitting data from a virtual I/O network device (e.g., transmitting, from a set of pages of guest physical memory, a number of bytes over a network using the device), the descriptor includes, in various embodiments, an identifier of the virtual I/O device to be used to transmit network data (e.g., a packet to be sent over a packet), as well as a set of guest physical addresses whose contents are to be included in the packet to be transmitted.

In the case of receiving data from a virtual I/O network device (e.g., receiving a next packet that comes in across a network into a set of pages of guest physical memory), the descriptor includes, in various embodiments, an identifier of the virtual I/O device to be used to receive the network data (e.g., a packet being received), as well as a set of guest physical addresses whose contents are to be overwritten by the contents of the packet when the packet is received.

The set of descriptors are written to guest physical memory, which is mapped to some portion of real physical memory on a node. After writing the set of descriptors (also referred to as a descriptor ring) to guest physical memory (corresponding to some guest physical addresses), a guest thread, running in a virtual processor, then issues a request to perform the I/O operation. Typically, the virtual processor is implemented on a physical processor that is on the same node as the physical memory that the descriptor was written to just prior to the issuance of the notification. The notification request indicates the virtual I/O device to be used in performing the I/O work. In some embodiments, the notification request is a notification sent to the virtual I/O device of a descriptor ring update. For example, the notification is an instruction issued to a particular I/O address (e.g., to wake up an I/O device).

The I/O emulation subsystem of the hyper-kernel on the same node as the physical processor detects the I/O request to the virtual I/O device. The hyper-kernel then determines the location of the physical I/O device implementing the virtual I/O device (i.e., which node in the cluster the physical I/O device is on).

If the physical I/O device implementing the virtual I/O device happens to be on the same node, then I/O device emulation on the node accesses the descriptor ring local to the node to perform the I/O operation.

If the physical I/O device implementing the virtual I/O device is determined to be on a remote node, then the hyper-kernel forwards the notification of the I/O request for work to be performed to the node with the physical I/O device. This transfers ownership of the request to the node with the physical I/O device.

In one embodiment, the physical I/O device on the remote node then polls the guest pages that contain the descriptors that were written by the guest. However, because the descriptors are most likely to be on the node from which the I/O request originated, those guest pages of memory would be migrated, resulting in overhead.

In an alternative embodiment, if the physical I/O device implementing the virtual I/O device is determined to be on a remote node, then the hyper-kernel on the node from which the request originated reads in the descriptor ring from its local node and forwards the descriptor ring to the remote node with the physical device.

The remote node, having received the forwarded descriptor ring, then implements the I/O request using the local physical I/O device according to the forwarded descriptor ring.

Depending on the type of I/O operation to be performed, various optimizations may be performed. For example, suppose that data is to be transferred from an I/O device and written into a set of guest physical addresses. The set of guest physical pages may be distributed across various nodes of the cluster. As will be described in further detail below, in one embodiment, the physical I/O device writes into portions of physical memory local to the node that the physical I/O device is on. The set of guest physical addresses are remapped to the locally written portions of physical memory, where the node with the physical I/O device takes ownership of those guest physical addresses. In one embodiment, the node on which the I/O request notification originated broadcasts a message to the other nodes in the cluster indicating that the set of guest physical addresses involved with the I/O operation will be mapped to the node that the physical I/O device is on. The other nodes then invalidate their portions of physical memory that had been mapped to the guest physical addresses, thereby maintaining cache consistency/coherency. Those invalidated pages of physical memory may then be reused for some other purpose.

As another example optimization, suppose that the contents at a set of guest physical addresses is to be transferred to the I/O device (e.g., to be written to a block storage device or transmitted over a network by a network device). In one embodiment, the node on which the I/O request initially originated transmits one or more messages to other nodes in the cluster, requesting those nodes to send, to the node with the physical I/O device, the contents of whatever subset of the guest physical addresses those nodes own. The messages may be an explicit request for the contents from the other nodes. As another example, if the physical I/O device is on a different node than the node on which the I/O request notification originated, then when the I/O request is forwarded to the node with the physical I/O, it is also sent to the other nodes of the cluster, notifying the other nodes of the I/O request. The other nodes then provide the contents of the subset of guest physical addresses that they own. By transmitting out the I/O request notification to other nodes, this saves network resources, as a separate request for the contents of guest physical addresses need not be made.

In some embodiments, the messages sent to other nodes in the cluster regarding the need for the contents of guest physical addresses is broadcast to all nodes. If a node has a subset of the guest physical addresses, then the node sends over the corresponding contents of the subset of guest physical addresses to the node with the physical I/O device. If a node does not have any of the guest physical addresses, then the node ignores the request for content.

In another embodiment, instead of broadcasting the message, the node from which the I/O request originated uses its resource map (used to track the location of virtual resources) to identify which nodes it believes to have the guest physical addresses involved in the I/O request. The node from which the I/O request originated then issues unicasts to those identified nodes, requesting the content (either through an explicit request, or by unicasting the I/O request to those identified nodes). A node that receives the unicast then processes the request. If the guest physical address is still on the node, then that node sends the corresponding contents to the node with the physical I/O. If the node no longer has the guest physical address (e.g., because it was recently migrated), then the node forwards the request for guest physical address content to the node that it believes has the guest physical address. The request may be forwarded until it arrives at the node that has a portion of local physical memory corresponding to the guest physical address, at which point the node then sends the corresponding contents to the node with the physical I/O device.

As another example optimization, suppose that contents from a set of guest physical addresses are to be sent to an I/O device for processing, where the node on which the I/O request (or descriptor ring update) originated is different from the node that has the physical I/O device. Suppose also that the originating node also has a subset of the guest physical addresses in its local physical memory. In one embodiment, when forwarding the descriptor ring or I/O request to the node with the physical I/O device, the originating node also transmits the contents of the subset of guest physical addresses that it has mapped to its local physical memory. This pre-emptive sending of the contents of the subset of guest physical addresses on the originating node improves efficiency of network resources, as a separate request for the contents needs not be made.

Additional examples of optimizations will be described in further detail below.

Figure 10:
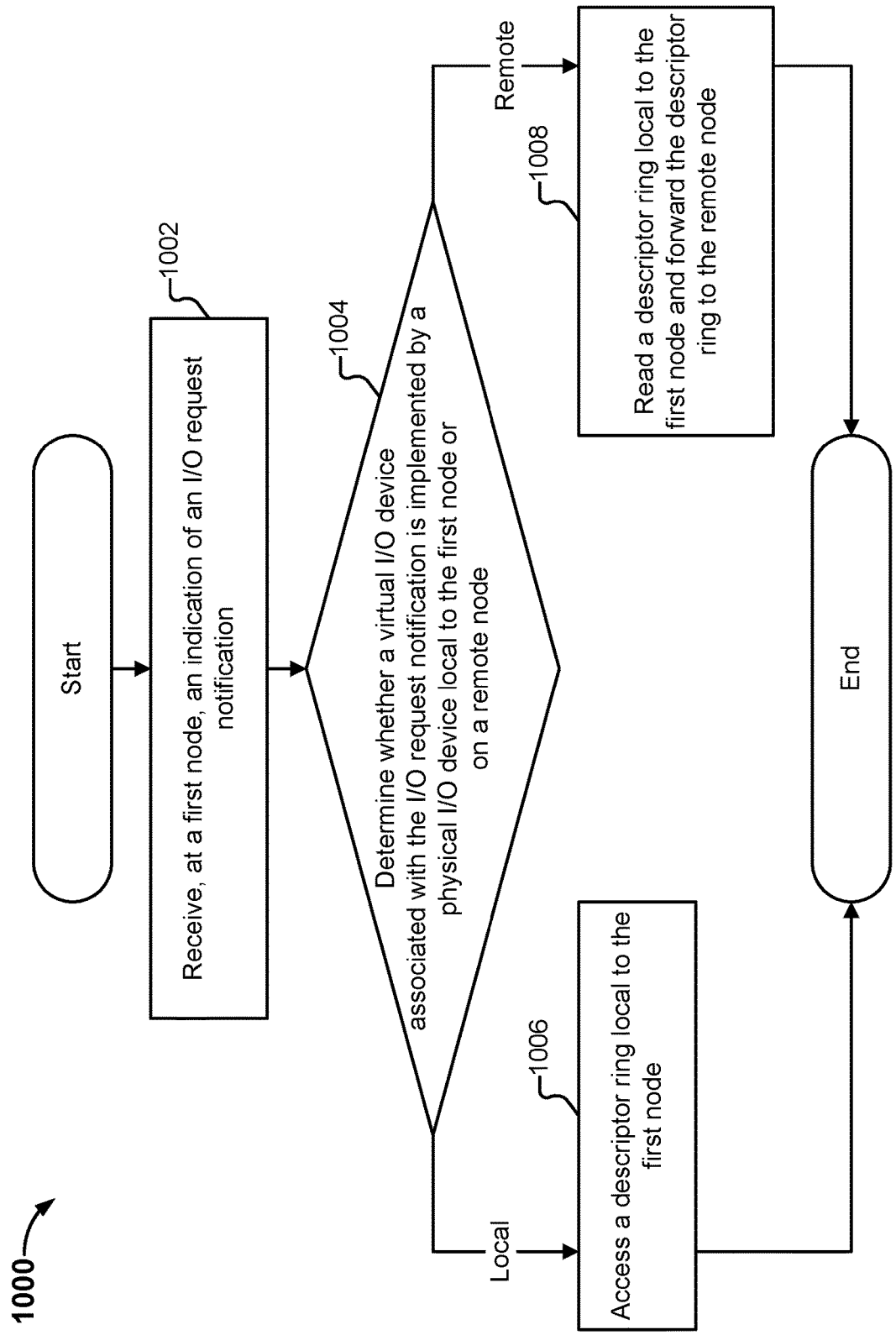
FIG. 10 is a flow diagram illustrating an embodiment of a process for handling an I/O request notification.

FIG. 10 is a flow diagram illustrating an embodiment of a process for handling an I/O request notification. In some embodiments, process 1000 is executed by a hyper-kernel. The process begins at 1002 when an I/O request notification is detected by a first node in a plurality of nodes.

At 1004, it is determined whether a virtual I/O device associated with the I/O request notification is implemented by a physical I/O device that is local to the first node or is on a remote node.

If the physical I/O device implementing the virtual I/O device is determined to be local to the first node, then the process continues to step 1006, where the descriptor ring is accessed on the first node. The physical I/O device on the first node fulfills the I/O request according to the locally accessed descriptor ring on the first node.

If the physical I/O device implementing the virtual I/O device is determined to be on a remote node different from the first node, the process continues to step 1008, where the descriptor ring is read on the first node and then forwarded to the remote node with the physical I/O device. The physical I/O device on the remote node fulfills the I/O request according to the forwarded descriptor ring.

I/O Devices and Referenced Pages

The descriptor ring describes the I/O work to be performed by the physical I/O device, and also references guest physical addresses with respect to which the I/O operation is to be performed. Some of the guest physical addresses referenced by the descriptor ring may be mapped to real physical pages of memory that are remote from/not on the same node as the physical I/O device. Described herein are techniques for implementing I/O operations using physical I/O devices that are remote from pages of physical memory to which guest physical addresses are mapped.

Reading from an I/O Device into Guest Physical Addresses

Consider the case of reading from an I/O device (e.g., reading blocks from a disk or reading a packet from a NIC into guest pages at guest physical addresses referenced in the descriptor ring).

The data from the I/O device is written to portions of physical memory that are local to the node that the physical I/O device is on. Remappings of guest physical addresses to some of the written portions of local memory may be performed.

For example, if a guest physical address referenced in the descriptor ring was already mapped to a page of local physical memory, then the appropriate portion of the data read from the I/O device is written to the local physical page of memory (e.g., using direct guest address memory for the I/O request), and remapping of the guest physical address is not performed.

If, however, a guest physical address referenced in the descriptor ring is mapped to a page of physical memory on a different node, then the guest physical address is remapped (e.g., by modifying a pointer between the guest physical address and a real page of memory) to a corresponding portion of the local physical page of memory, and the remote node is notified of the remapping.

The remapping of guest physical addresses is in contrast to migrating the guest pages at the guest physical addresses to the node with the physical I/O device and then overwriting those pages. In this way, the pages need not be migrated, which reduces processing overhead.

Upon performing any remapping (as needed), the node with the physical I/O device notifies the other nodes in the cluster of the remapping of the guest physical addresses, so that the other nodes in the cluster may update their data structures indicating the location of those guest physical addresses. If a node no longer has ownership of a guest physical address after the remapping, then the node invalidates the portion of local physical memory that was previously mapped to the guest physical address (e.g., according to the example cache coherency protocol described above).

In another embodiment, as described above, rather than the node with the physical I/O device notifying the other nodes in the cluster of the update to the mapping of the guest physical addresses that were written into, the node from which the I/O request originated (which may be different from the node with the physical I/O device) pre-emptively sends out a notification indicating that the ownership of the guest physical addresses associated with the I/O request will move to the node with the physical I/O device.

Figure 11:
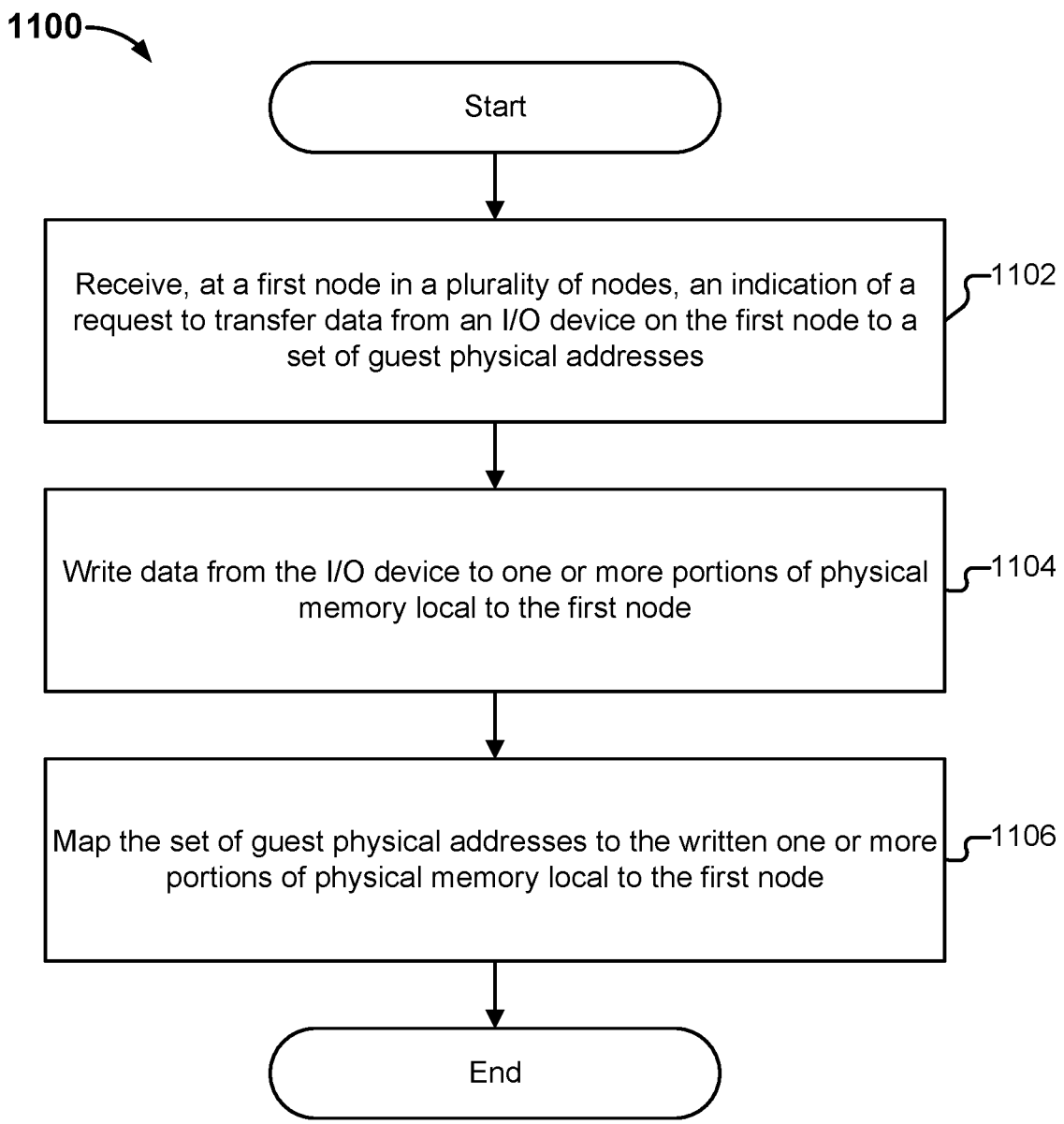
FIG. 11 is a flow diagram illustrating an embodiment of a process for transferring data from an I/O device into a set of guest physical addresses.

FIG. 11 is a flow diagram illustrating an embodiment of a process for transferring data from an I/O device into a set of guest physical addresses. In some embodiments, process 1100 is executed by a set of hyper-kernels. The process begins at 1102 when an indication is received, at a first node in a plurality of nodes, of a request to transfer data from an I/O device on the first node to a set of guest physical addresses. At 1104, the data from the I/O device is written to one or more portions of physical memory local to the first node. At 1106, the set of guest physical addresses are mapped to the written one or more portions of the physical memory local to the first node. In one embodiment, guest physical addresses that are mapped to portions of physical memory on other nodes in the plurality of nodes are remapped to corresponding portions of physical memory local to the first node. Nodes in the cluster are notified of the update to the mapping of the guest physical addresses. Upon completion of the I/O request, a notification of completion of the I/O request is transmitted.

Writing Content of Guest Physical Addresses to an I/O Device

Consider the case of writing to an I/O device (e.g., writing the contents of guest pages at guest physical addresses referenced in the descriptor ring to blocks of a disk or transmitting the contents of the guest pages at the guest physical addresses referenced in the descriptor ring over a network).

In one embodiment, the node with the physical I/O device pulls the pages at the guest physical addresses from across the cluster and writes them to the physical I/O device. Pulling (migrating) the pages over the network and changing their ownership introduces network and resource overhead. Further, it may disrupt locality, as it is likely that the pages that were migrated for the I/O request will be needed by the nodes that they came from, after the I/O request is completed.

Rather than pulling and migrating pages, in some embodiments, the contents of the guest pages at the guest physical addresses are obtained at the node with the physical I/O device. The contents of the guest physical addresses may be obtained in various ways, accounting for, for example, the distributed nature of the physical memory to which the guest physical addresses are mapped. For example, the guest physical addresses referenced by the descriptor are obtained. For each of the guest physical addresses, it is determined whether the guest physical address is mapped to a real page of physical memory that is local to the node on which the physical I/O device resides, or whether the guest physical address is mapped to a real page of physical memory that is on a remote node, different from the node on which the physical I/O device resides.

If the node with the physical I/O device owns the page mapped to a guest physical address, then it directly reads the contents of the page of local memory. If, on the other hand, a guest physical address is mapped to a page of physical memory resident on a remote node, then the contents of those remote pages are requested by the node with the physical I/O device (e.g., by transmitting one or more messages from the node with the physical I/O device to the other nodes in the cluster) and sent by the other nodes to the node with the physical I/O device. The messages may be broadcast to the entire cluster. Unicast messages to other nodes that the node with the physical I/O device believes to have subsets of the guest physical addresses (e.g., based on the current resource map of the node with the physical I/O device) may also be transmitted, where content requests may be forwarded throughout the cluster until they reach a node that has ownership of some of the guest physical addresses specified in the I/O request.

The contents of the pages at the specified guest physical addresses are converged at the node with the physical I/O device.

In the above example, the node with the physical I/O device requests contents of guest physical addresses from other nodes in the cluster. As described above, the node from which the I/O request originated (which may be a different node than the node that the physical I/O device is on) pre-emptively messages nodes in the cluster to send, to the node with the physical I/O device, the contents of any guest physical addresses that they have, so that the contents may be obtained, aggregated, or otherwise received at the node with the physical I/O device.

As described in the examples above, rather than migrating the guest pages at the guest physical addresses to the node with the physical I/O device, the contents of the guest physical addresses (e.g., a snapshot of the contents of the real physical memory mapped to the guest physical addresses) are obtained by the node with the physical I/O device. In this case, ownership of the page stays the same. That is, the guest physical addresses are still mapped to the same node(s), since it is their contents that are needed to fulfill the I/O operation. Since the ownership of the pages need not change, and page migration need not be performed, this reduces the overhead involved with sending messages, page migration, and maintaining cache consistency/coherency. Further, no remapping of pointers of guest physical addresses to portions of physical memory need be performed. As another benefit, by delivering snapshots of the pages rather than migrating the pages themselves, locality of the pages and the nodes they are on is not disrupted. Overhead is not incurred to maintain memory consistency, because memory consistency is the same as it was prior to the I/O operation.

Figure 12:
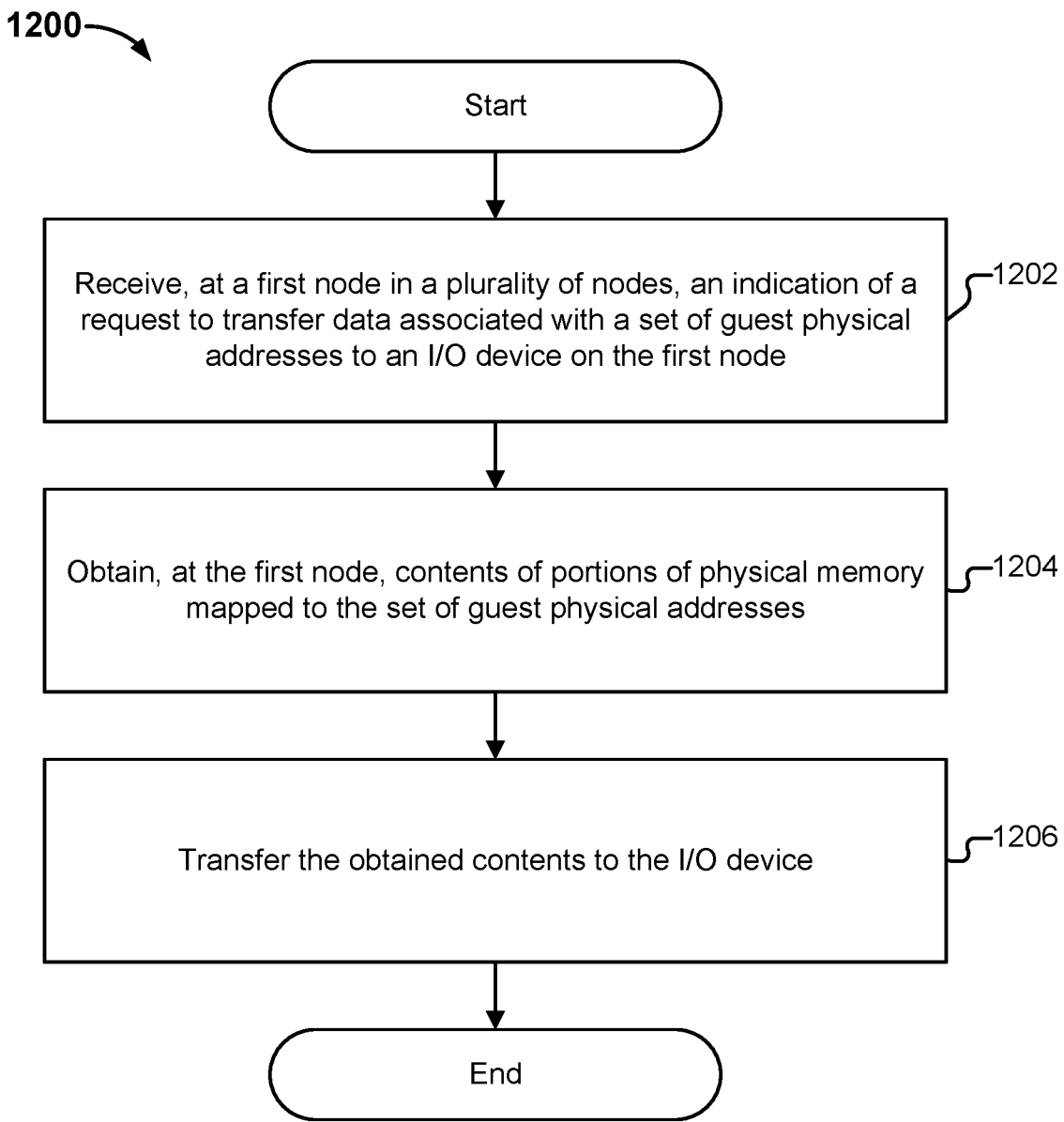
FIG. 12 is a flow diagram illustrating an embodiment of a process for transferring content of a set of guest physical addresses to an I/O device.

FIG. 12 is a flow diagram illustrating an embodiment of a process for transferring content of a set of guest physical addresses to an I/O device. In some embodiments, process 1200 is executed by a set of hyper-kernels. The process begins at 1202 when an indication is received, at a first node in a plurality of nodes, of a request to transfer data associated with a set of guest physical addresses to an I/O device on the first node. At 1204, contents of portions of physical memory mapped to the set of guest physical addresses are obtained at the first node. At 1206, the content is transferred to the I/O device. Subsequent to completion of the I/O request, a notification of completion of the I/O request is transmitted.

Completion of I/O Request

When the requested work is completed by the I/O device, a notification response is transmitted to the guest operating system, notifying the guest that the I/O device operation has been completed. For example, the guest operating system may expect to receive an interrupt to be received via a particular guest virtual processor that the guest operating system believes to be a real physical processor. In one embodiment, the hyper-kernel, which includes an interrupt emulation subsystem, emulates the interrupt expected by the guest operating system (as well as the manner in which virtual interrupts are delivered) in response to receiving an actual interrupt from the physical I/O device upon completion of the I/O work.

As one example, suppose that the I/O request is to write contents of pages mapped to a set of guest physical addresses to a physical disk. In some embodiments, when writing to the disk, an interrupt is generated for each page that is written to the physical disk.

The interrupts are provided to a particular physical CPU on a node. The physical CPU, upon receipt of the interrupts, executes various logic to deliver the interrupt to a thread of the hyper-kernel that happens to be running on the node. The thread of the hypervisor, based on receiving the interrupt, determines that the requested I/O operation has been emulated and is complete, and that it should deliver a virtual interrupt to the guest operating system notifying the guest that the I/O operation is complete.

That is, the hyper-kernel delivers a virtual interrupt to the guest operating system as if it were the virtio device delivering an interrupt, which, for example, should be delivered to a particular virtual guest processor that is defined according to interrupt mapping tables of the guest system.

In some embodiments, the interrupt mapping tables of the virtual guest machine are emulations of the standard hardware. For example, in the case of the Intel architecture, there is a specific virtual processor on which the interrupt will take place. The processor architecture includes a piece of hardware known as the interrupt controller. In some embodiments, the hyper-kernel interfaces to the interrupt controller, which, in the example of the Intel architecture, may be the Advanced Programmable Interrupt Controller (APIC) (or the x2APIC for the later version of the controller).

In one embodiment, the hyper-kernel emulates the interrupt controller for the guest. In one embodiment, this emulation of the interrupt controller is implemented by a distributed subsystem of the hyper-kernel that is configured to perform interrupt controller emulation (e.g., APIC emulation). In one embodiment, the interrupt controller emulation subsystem includes a mechanism by which it sends a message from wherever the interrupt was generated (which is typically a virtualized device, but may be another virtual processor—for example, a virtual interrupt, generated by the emulated virtio device or sent from one virtual processor to another) to the virtual processor expected to receive the interrupt. That is, the message is routed to whatever node has the particular virtual processor. If the virtual processor has moved, the message follows the movement of the virtual processor (which is a tracked resource), until the message arrives at the virtual processor. The real interrupt that was sent is then reflected to the guest operating system via this emulation.

In one embodiment, the virtual processor that receives the virtual interrupt is waiting in the event table for the virtual interrupt event to occur. The virtual processor may then be reactivated when the virtual interrupt occurs.

Additional Embodiments of Distributed I/O Virtualizaton

Described below are additional details regarding distributed I/O virtualization. For illustrative purposes, adaptions of the virtIO standard for the software defined server are described. For example, details regarding distributed virtIO block and distributed virtIO network are described. Further, various examples describing various distributions of resources (e.g., various scenarios with varying relative locations of I/O request origination, physical I/O device, and guest physical addresses) involved in the fulfilling of an I/O request are described.

Additional Details Regarding Virtio

Queue Descriptor

As described above, a descriptor is a data structure that describes the I/O work to be performed. A chain or queue of descriptors is a unit of a single I/O request, and is made up of multiple "chained" descriptors. As one example, suppose that an I/O operation is issued to read file contents into memory. The memory may not be contiguous, and so the memory is chained together so that when the request is being satisfied, the contents are placed in these non-contiguous blocks of memory.

Block Devices

A ring of descriptors associated with a block device I/O request points to a read or write request block containing the address to read from and how many bytes to read. Buffer addresses are specified in the descriptors of the chain. The last descriptor in the chain specifies where to write the completion error condition.

Network Devices

In some embodiments, with respect to network devices, there are two virtIO queues that act independently on the same physical Ethernet device: Receive ring; and Transmit ring.

The receive ring is offered as a set of buffers (guest physical memory) that Ethernet frames are copied into. The guest is notified when buffers are written to. The chain length is 1 descriptor.

The transmit ring includes Ethernet frames that are to be written to the Ethernet device. These are offered as each frame is made available by the guest when the guest needs to transmit data over a network (e.g., the Internet, a LAN, a WAN, intranet, etc.).

Software Defined Server Virtio Parameters

In some embodiments, indirect descriptors are disabled because they may lead to additional pages that potentially create more stall overhead.

The size of the descriptor ring may be increased, but may be limited because large ring sizes may result in more pages for the virt queue on which the VCPU could stall on.

In some embodiment, TCP Segmentation Offload (TCO) and Large Receive Offload (LRO) are offered to the guest to assist with network performance. These features of the TCP/IP protocol inside the NIC may be used to parse network datagrams.

Virtio Block

In the distributed system described herein, each node includes a virtio-blk device emulation worker. The blk device emulation system on the node with the physical I/O device is referred to herein as the primary blk, while the other blk's on the other nodes are proxy workers, which are stateless, and which are referred to herein as blk'. The blk' proxy workers maintain progress on which guest physical pages have been delivered to the primary blk, but otherwise are not concerned about the current state of the descriptor ring. In one embodiment, each virtio block device (and network device) has one "virtual I/O processor" (VIOP) on each node. When accessing the device, the VCPU interacts with the VIOP on the node on which it is running; the VIOP will send messages to the associated VIOPs on the other nodes as needed. In some embodiments, the "blk" and "blk'" refer to VIOPs on the node with the device and a different node, respectively.

On reset of a virtual storage device, the primary blk and proxy blk' reset their states as well.

Optimal Case

Figure 13A:
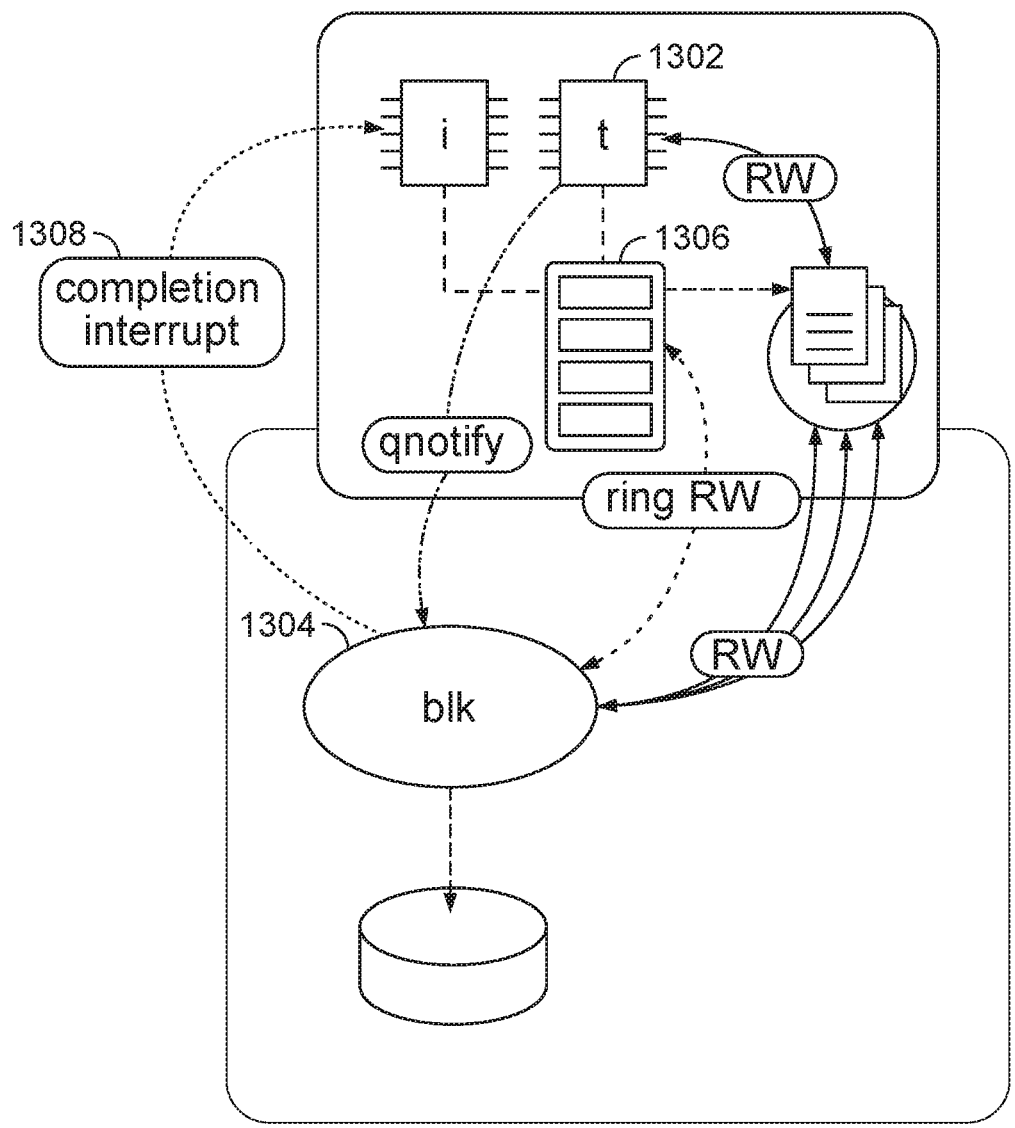
FIG. 13A illustrates an embodiment of block I/O emulation.

FIG. 13A illustrates an embodiment of an optimal case in which VCPUs, the virtio device (physical device), and pages involved in the I/O operation are all local to a node (where there are no remote pages).

In this example, a process thread t (1302) notifies the device of a descriptor ring update.

The primary blk device emulation (1304) accesses the descriptor ring (1306) and pulls out the request chains. A request structure is built from the chain information. The request structure includes a block IO request header, buffer addresses (guest physical addresses), and a result address.

The primary blk issues block IO to disk; buffer pages (of local physical memory) are written to directly from the disk IO request. During an I/O read in this scenario, in which the virtio device and the physical pages of memory mapped to the guest physical addresses implicated in the I/O transfer are local to each other, since the guest physical addresses are mapped to portions of physical memory local to the node on which the physical I/O device resides, those portions of memory are written into directly. In contrast to scenarios in which the guest physical addresses were mapped to portions of physical memory on remote nodes (with respect to the node with the virtio device), notifications of updates to the ownership of the guest physical addresses need not be made (since the ownership is not changing, and thus, memory consistency is maintained). The contents of the local memory mapped to the guest physical addresses are overwritten with the data read from the physical I/O device.

Upon completion of the I/O operation, the descriptor ring is updated with the completed chain index.

An interrupt (1308) (if enabled by the guest) is then issued to the interrupt handling VCPU.

Remote Buffers Case

Figure 13B:
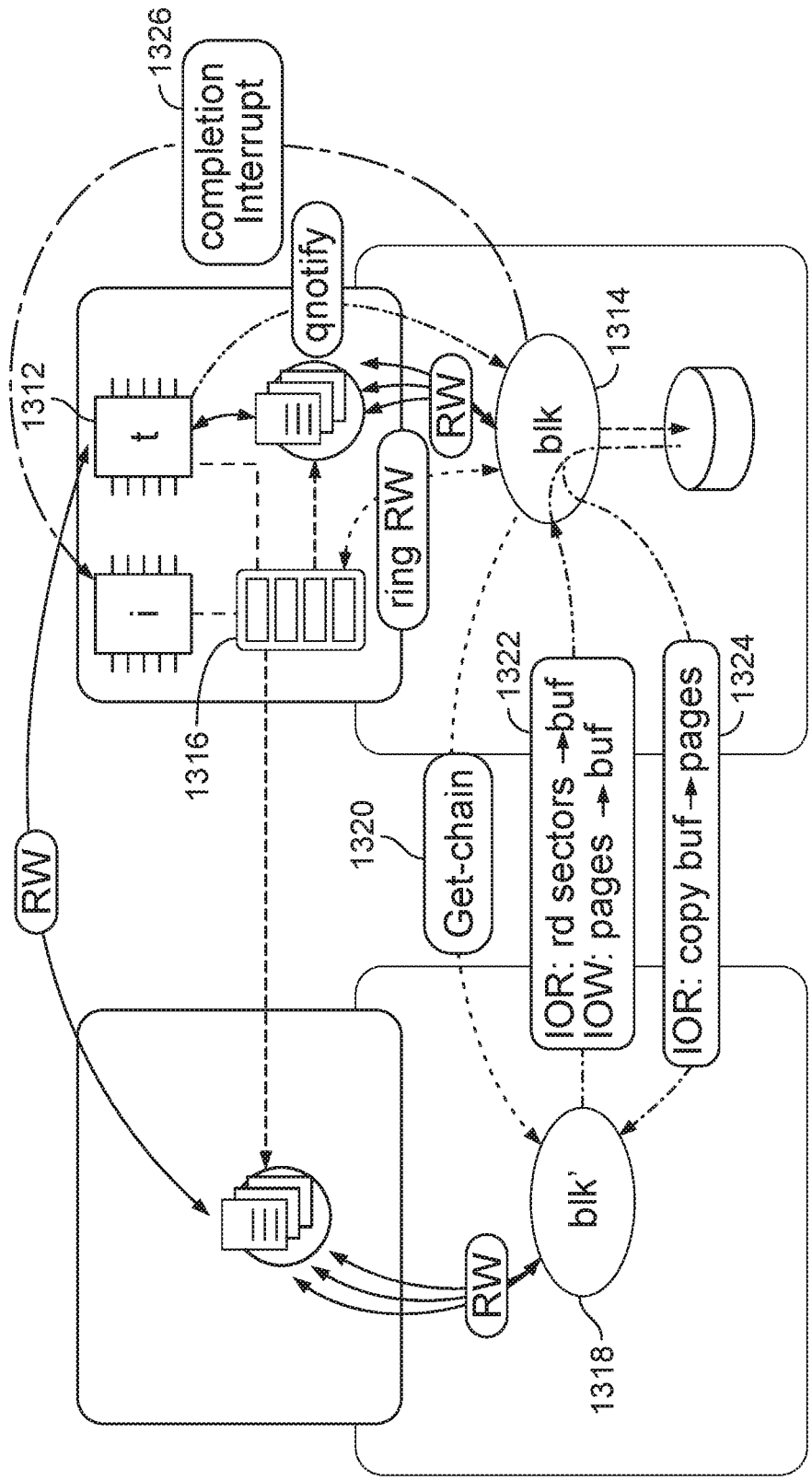
FIG. 13B illustrates an embodiment of block I/O emulation.

FIG. 13B illustrates an embodiment of a remote buffers case. In this example, the VCPU that issues the I/O request, the virtio device involved in the request, and the descriptor ring are all local to each other and on the same node. However, some of the buffers (physical pages corresponding to some of the guest physical addresses) exist on a remote node relative to the location of the physical device.

As shown in this example, the process thread "t" (1312) notifies the device of a descriptor ring update.

The primary blk device emulation (1314) accesses the descriptor ring (1316) and identifies the nodes that own the pages referenced from the descriptors.

The primary blk notifies blk' proxies (1318) on other nodes to wire down those pages until the I/O request has completed.

If the chain header page is not available locally, the primary blk will request (1320) a proxy blk' to send the chain header (virtio request) blocks back to it. If the request is an I/O write, then pages containing the sectors to write are also fetched (1322) and sent to the primary blk.

In one embodiment, on I/O read completion, the primary block sends sectors read into proxy blk' to fill its pages (1324). In an alternative embodiment, the sectors are read into pages of physical memory local to the node on which the virtio device and primary blk reside. In some embodiments, after the physical memory local to the virtio device has the read sectors, the data is sent over to remote nodes that have ownership of remote guest physical addresses in order to overwrite the physical memory on those remote nodes that are mapped to the remote guest physical addresses.

In another embodiment, as described above, the primary blk notifies other nodes (via the proxy blk' of the other nodes) that the node on which the primary blk is on has ownership of the guest physical addresses. The remote nodes that previously held any of the guest physical addresses update their resource tracking data structures (e.g., page tables, maps, etc.) to indicate that the previously held guest physical address is no longer mapped to the remote node's real physical memory, and that the guest physical address now exists on the node that the primary blk is on. If there are multiple guest physical pages that are fragmented on multiple nodes, then multicast (either broadcast or direct unicasts) may be sent out notifying the change of ownership of the guest physical addresses. The remote nodes, in response to the notification, invalidate the pages of memory that they have local that were previously mapped to the guest physical addresses (e.g., via the cache coherency protocol described above). The invalidated pages may then be reused since their contents have been invalidated.

One example of an optimization during an I/O read is as follows. In some embodiments, it is determined what data is being read from the disk and used to overwrite the contents of a page of memory. If the data is all zeroes, rather than committing processing resources to writing and storing a page full of zeroes, the guest physical address is marked in a state as a dormant page. The guest physical address is still mapped to a node (whether the node with the primary blk, or the original node with the mapping to the guest physical address), but an actual page of memory need not be allocated to the guest physical address. As one example, the node owning the guest physical address may change the status of the page to dormant in its resource maps, and deallocate the page of memory that had previously been mapped to the guest physical address, freeing the page for other uses.

On chain completion, the descriptor ring is updated with a completed chain index.

An interrupt (1326) (if enabled by the guest) is then issued to the interrupt handling VCPU.

Fragmented Buffers, Remote Descriptor Ring

Figure 13C:
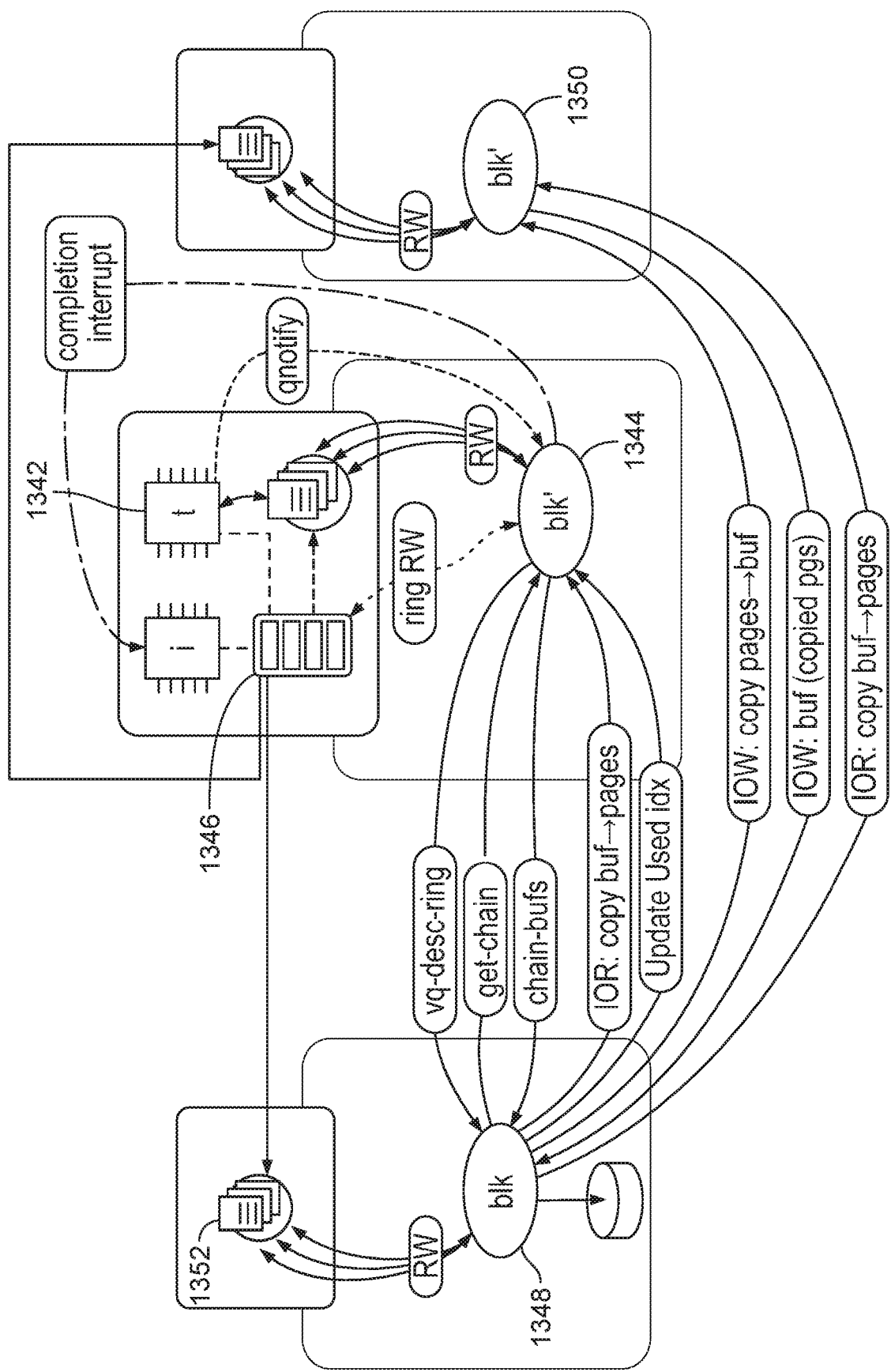
FIG. 13C illustrates an embodiment of block I/O emulation.

FIG. 13C illustrates an embodiment of fragmented buffers, remote descriptor ring case. In this example, the VCPU issuing the request and the descriptor ring are remote from the virtio device (e.g., the VCPU issuing the request and descriptor ring are on a different node than the virtio device). Further, in this example, the guest physical addresses involved in the I/O operation map to portions of physical memory that are fragmented across different nodes.

The process thread "t" (1342) notifies the virtio device of a descriptor ring update. The notification is provided directly to the proxy blk' handler (1344) on the same node.

The proxy blk' (1344) reads in the complete descriptor ring (1346), along with pages referenced by the chains that are local to it and that have not yet been sent to the primary blk (1348).

The proxy blk' (1344) sends the descriptor ring and these requests (and in the case of I/O writes, the data pages or its contents) to the primary blk (1348) on the node with the physical I/O device.

In the case of I/O reads, where, for example, the I/O is to be performed into a larger block of memory with multiple pages (where those pages may currently be fragmented across multiple nodes), in some embodiments, before the I/O request is issued to the virtio device (e.g., by the proxy blk' sending the descriptor ring and the requests to the node with the primary blk), a message is multicasted to all of the nodes of the software defined server, indicating a list of guest physical addresses that are to be overwritten, and the node on which the overwriting will occur (the node with the primary blk for the virtio device involved on the I/O request).

As one example, suppose that the guest operating system requests that a megabyte of data be read off of the disk, starting from a certain block address, into a scattered list of guest physical addresses, which may or may not be contiguous in the guest physical memory, and which are represented by real physical pages of memory that are fragmented across the nodes of the software defined server. When the multicast is transmitted of the guest physical addresses to be overwritten, the other nodes update their data structures of where those nodes believe the guest physical addresses to be. That is, because the guest physical addresses are to be overwritten, the nodes will update their data structures to indicate that the guest physical addresses implicated in the I/O read request now exist on the node with the primary blk for the virtio device. Thus, a global overwrite is performed of the guest physical addresses indicated in the I/O request. The notification reconfigures the software defined server so that the nodes of the system are aware that the list of pages in the I/O transfer are on the node with the primary blk. By performing the notification and the overwriting, memory consistency is maintained.

The primary blk iterates through the chains and identifies any request headers that are not local to it, and sends them to the nodes owning them (partial 'get-chain').

Proxy blk' nodes (e.g., proxy blk' 1350) send the requested page contents to the primary blk. The pages are locked down to the nodes until I/O has completed for the request(s).

The primary blk (1348) issues I/O to disk. If pages are local to the node (e.g., pages 1352), then direct guest address memory is used for the I/O request.

In this example, on I/O read completion, the read buffers (physical pages) are sent to the owning nodes, which then unlock the pages so that they may be migrated if necessary. In other embodiments, the blocks from the I/O device are written to local physical memory, where the guest physical addresses implicated in the I/O request are mapped to the overwritten local physical memory. To maintain memory consistency, the other nodes in the system are notified of the remapping of guest physical addresses. The other nodes then invalidate whatever subset of pages they had owned that had been mapped to the guest physical addresses.

On I/O completion, the primary blk sends the completed indexes (idx(s)) to the node with the descriptor ring to update the used ring.

When performing, for example, an I/O read involving multiple blocks to be written into multiple pages, the block reading into guest physical addresses is performed as multiple requests, one for each block. In one embodiment, the guest operating system is not notified that the I/O is complete until the I/O transfer of all of the listed pages of guest physical memory is complete, which minimizes context switches.

An interrupt (if enabled by the guest) is issued to the interrupt handling VCPU.

Upon completion of I/O transfer, the resource migration mechanisms described above may be used to migrate pages/vcpus when pages are being accessed by processors on different nodes (causing stalls). For example, in the case of a read, in which a set of pages was overwritten, the cost functions may be biased to migrate the VCPU that requested the I/O request to the node with the pages, since it is likely that the VCPU that requested the data read from the disk will want to access the pages that now hold the requested blocks of data.

In some embodiments, the pattern of access of VCPUs and the results of I/O operations are tracked, where pages that are written into may be immediately collocated with the VCPUs that were observed to request access to them—that is, resource migration may be performed pre-emptively, without waiting on a stall.

Virtio Block Optimization

Common Storage Backend Across Nodes

The hyper-kernel emulates a virtual disk drive that is presented to the guest operating system. The virtual disk drive may be implemented in any way that achieves storage. For example, the distributed hypervisor (hyper-kernel) may use a storage area network or a network attached storage (NAS) or any other fabric as appropriate that connects to storage to provide, for example, backup storage. The hyper-kernel manages the virtualization such that the guest operating system does not see the complexity of the physical device implementations, and only observes a single virtualized disk.

Figure 13D:
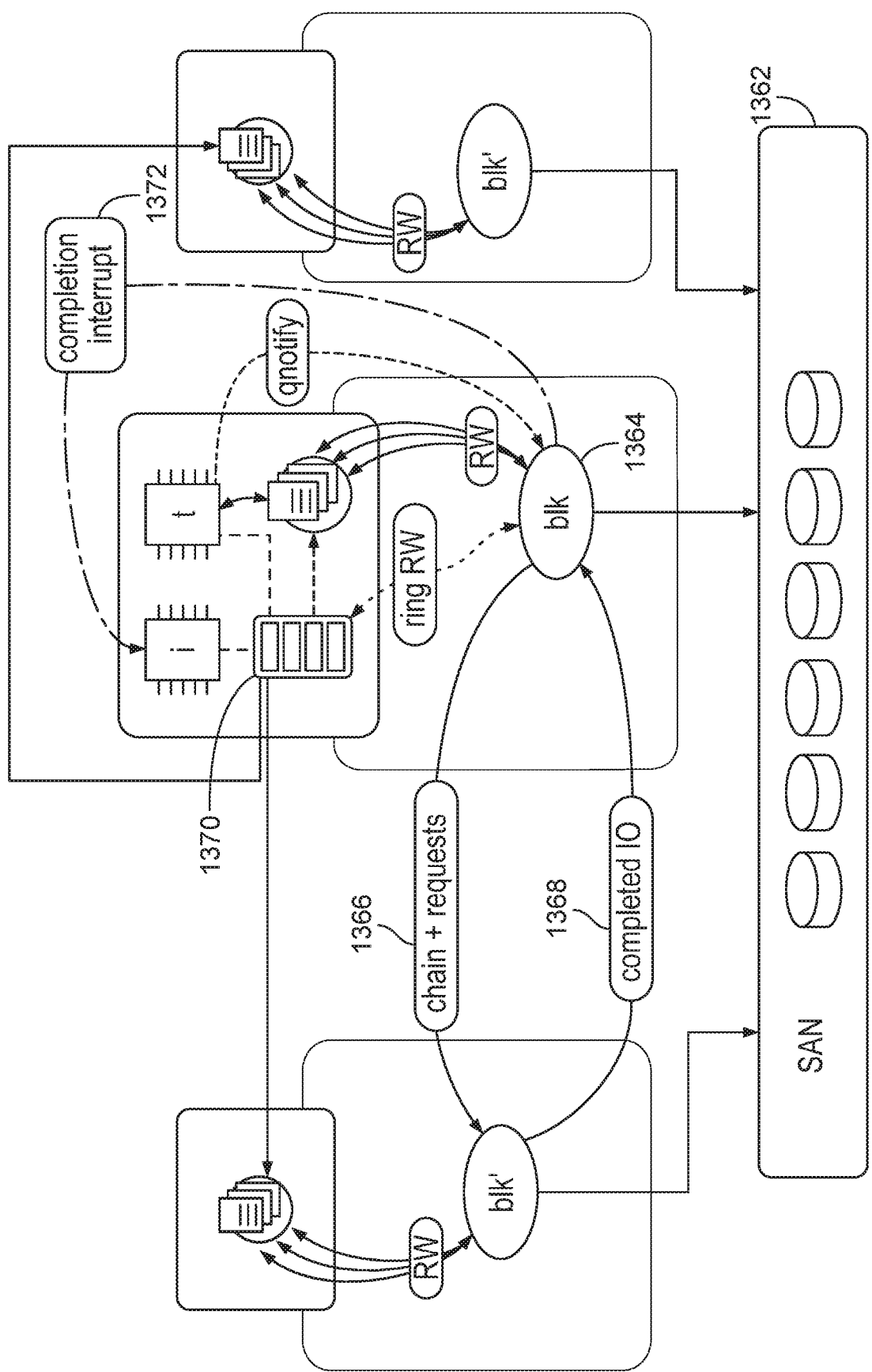
FIG. 13D illustrates an embodiment of block I/O emulation.

FIG. 13D illustrates an embodiment of a common storage backend across nodes. As shown in this example, all nodes of the software defined server connect to a common storage backend (storage area network (SAN) 1362).

In this example, the primary blk (1364) sends to other nodes the chain requests (e.g., 1366) that need to be completed (in this case, any of the blks could be designated as the primary blk).

On I/O completion, other nodes notify the primary blk of which I/O request is completed (e.g., 1368).

The primary blk will update the descriptor ring (1370) to indicate the completed process.

Finally, the guest is interrupted (1372).

Figure 14A:
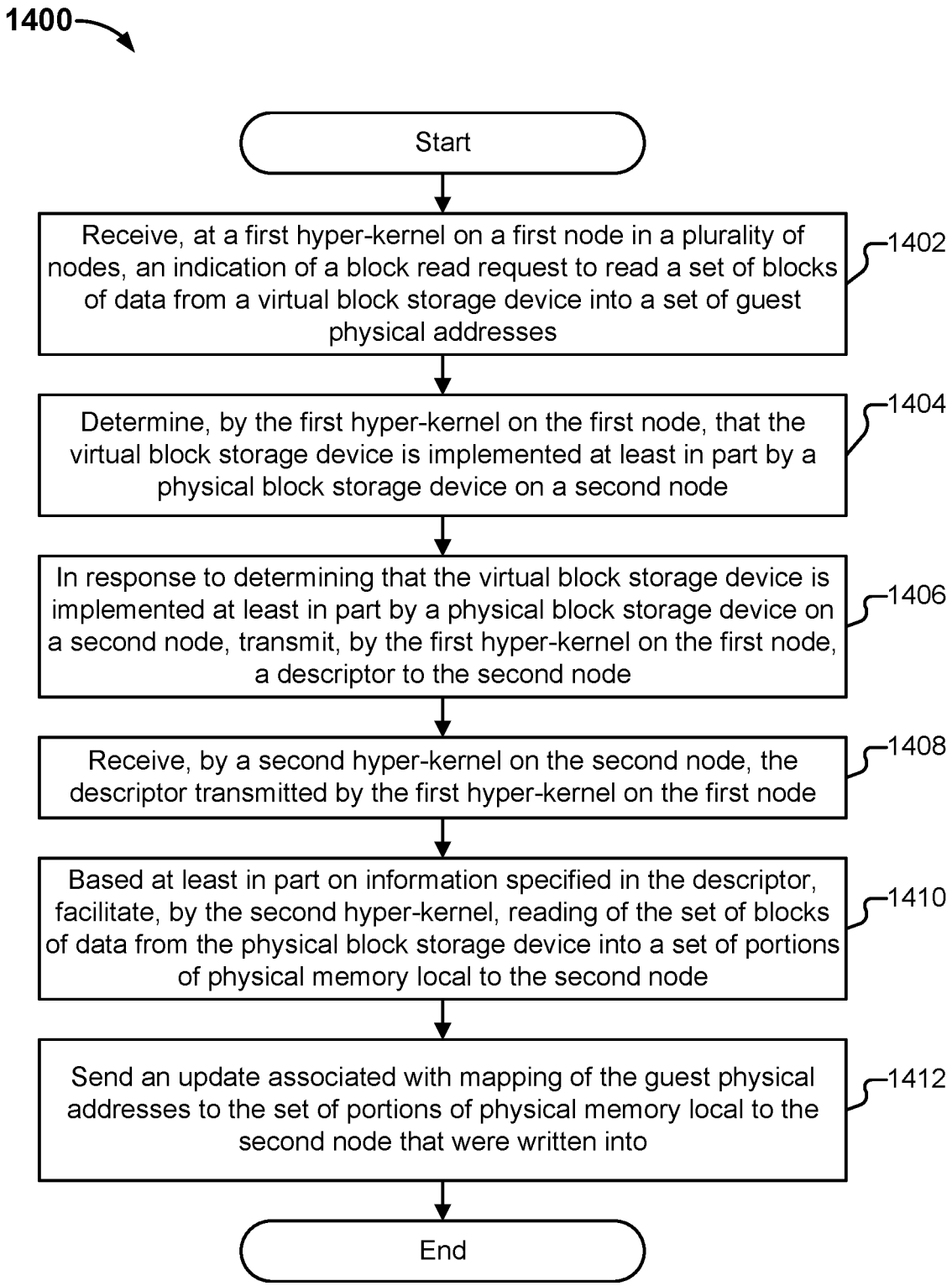
FIG. 14A is a flow diagram illustrating an embodiment of a process for reading a set of blocks of data from a block storage device into a set of guest physical addresses.

FIG. 14A is a flow diagram illustrating an embodiment of a process for reading a set of blocks of data from a block storage device into a set of guest physical addresses. In some embodiments, process 1400 is executed by a set of distributed hyper-kernels executing on a plurality of physical nodes. The process begins at 1402 when a first hyper-kernel on a first node receives an indication of a block read request to read a set of blocks of data from a virtual block storage device into a set of guest physical addresses. As one example, a guest operating system running collectively across the plurality of physical nodes directs a guest virtual processor (VCPU), via a guest thread, to request that the set of blocks be read from a virtual disk, where the read set of blocks are to be written into pages at a set of guest physical addresses. The VCPU that is directed to receive the request is implemented by a physical processor on the first node. The hyper-kernel detects the I/O request.

At 1404, the first hyper-kernel on the first node determines that the virtual block storage device is implemented at least in part by a physical block storage device on a second node. For example, each node of the system includes an internal directory of which disks are on which nodes. The hyper-kernel on the first node evaluates the internal directory to determine where the one or more physical devices are that are used to implement the virtual I/O device implicated in the request (e.g., based on a lookup of virtual device I/O addresses included in the I/O request).

At 1406, in response to determining that the virtual block storage device is implemented at least in part by a physical block storage device on a second node, the first hyper-kernel on the first node transmits a descriptor to the second node, the descriptor specifying information usable to implement the block read request. For example, prior to the I/O request being made by the process thread, the set of descriptors were written to the physical memory local to the first node. The first hyper-kernel obtains the set of descriptors from the local physical memory and forwards them to the second node.

In this example, a descriptor describes what set of blocks to read off of a disk into what guest physical addresses. Each descriptor describes the I/O operation with respect to one block. If multiple blocks are to be read from, then a chain of descriptors is forwarded from the first node to the second node. In some embodiments, the set of descriptors also indicates that the guest operating system is to be notified upon completion of the I/O transfer request.

At 1408, a second hyper-kernel on the second node receives the descriptor transmitted by the first hyper-kernel on the first node.

At 1410, based at least in part on the information specified in the descriptor, the second hyper-kernel facilitates reading of the set of blocks of data from the physical block storage device into a set of portions of physical memory local to the second node. The set of guest physical addresses are mapped to the set of portions of the physical memory local to the second node. In some embodiments, the (re)mapping of guest physical addresses is performed by updating resource maps/page tables such that the guest physical addresses now point to the local physical memory on the second node that the blocks were written into. If the page corresponding to a guest physical address is already on the second node, then no re-mapping needs to be done—that is, remapping is performed for guest physical addresses that had previously been owned by nodes on other nodes in the system.

At 1412, an update associated with the mapping of the set of guest physical addresses to the set of portions of the physical memory local to the second node is sent to a set of other nodes in the plurality of nodes. For example, messages are transmitted to one or more other nodes in the system indicating that the guest physical addresses are owned by the second node.

The other nodes, upon receipt of the update messages, perform consistency maintenance by updating their respective resource maps and page tables to indicate that the set of guest physical addresses is on the second node. The other nodes also invalidate the real physical pages that had been previously mapped to any subset of the guest physical addresses.

In the above, it is determined at 1404 that the virtual block storage device is implemented by a physical block storage device on a second node. If, however, it is determined instead, at 1404, that the virtual block storage device is implemented by a physical block storage device that is also on the first node, then the descriptor does not need to be forwarded to a remote node. Instead, the descriptor is locally accessed, steps 1406-1408 need not be performed, and steps 1410-1412 are performed by the first node.

Figure 14B:
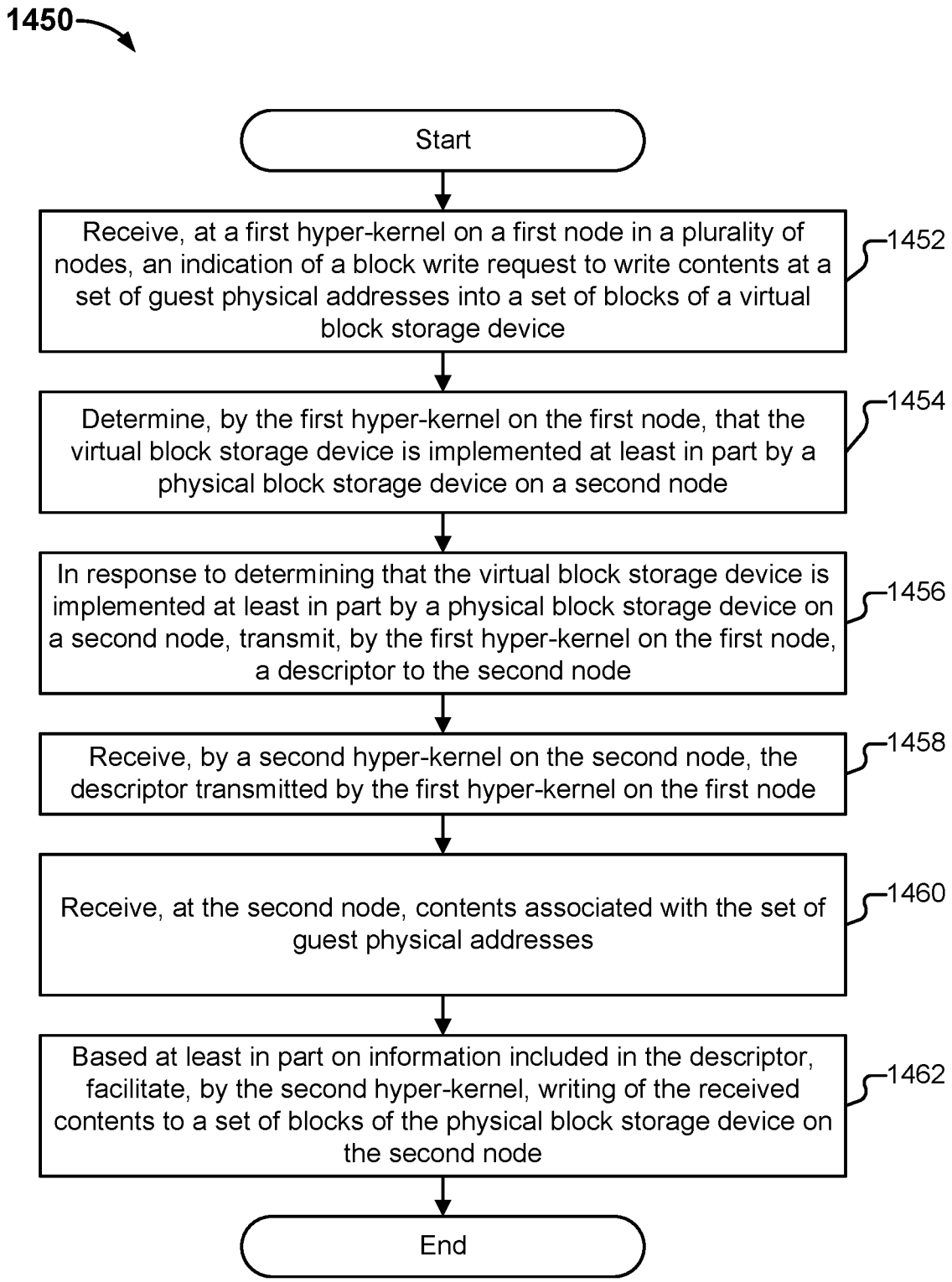
FIG. 14B is a flow diagram illustrating an embodiment of a process for writing contents of a set of guest physical addresses to a set of blocks of a block storage device.

FIG. 14B is a flow diagram illustrating an embodiment of a process for writing contents of a set of guest physical addresses to a set of blocks of a block storage device. In some embodiments, process 1450 is executed by a set of distributed hyper-kernels executing on a plurality of physical nodes. The process begins at 1452 when a first hyper-kernel on a first physical node receives an indication of a block write request to write contents at a set of guest physical addresses into a set of blocks of a virtual block storage device.

At 1454, the first hyper-kernel on the first node determines that the virtual block storage device is implemented at least in part by a physical block storage device on a second node in the plurality of physical nodes.

At 1456, in response to determining that the virtual block storage device is implemented at least in part by a physical block storage device on the second node, the first hyper-kernel transmits a descriptor to the second node, the descriptor specifying information usable to implement the block write request.

In some embodiments, the first hyper-kernel on the first node determines whether it has, in its local memory, any pages mapped to guest physical addresses in the set of guest physical pages (either replicated pages, primary pages, exclusive pages, etc.). If so, then the first node also obtains the contents of those pages and includes them with the forwarded descriptor ring.

In some embodiments, the first node also transmits a set of messages (e.g., unicasts, multicast, broadcast, as described above) to other nodes to request that those other nodes send to the second node the contents of whatever subset of pages that they happen to have (which could be a replicated page) that are mapped to guest physical addresses in the set of guest physical addresses.

At 1458, the second hyper-kernel on the second node receives the descriptor transmitted by the first node.

At 1460, the second hyper-kernel on the second node receives contents associated with at least some of the set of guest physical addresses. As described above, in some embodiments, the contents are received in response to a request transmitted by the first hyper-kernel on the first node to one or more nodes in the plurality of physical nodes for contents at the set of guest physical addresses. The first hyper-kernel may also send any contents that are resident on the first physical node to the second node when, for example, the first hyper-kernel forwards the descriptor to the second node. In other embodiments, the contents are received in response to one or more requests made by the second hyper-kernel on the second node to one or more other nodes in the plurality of physical nodes. If the second node has pages of local physical memory mapped to a subset of the guest physical addresses, then the second node directly obtains the local contents.

At 1462, based at least in part on the information specified in the descriptor, the second hyper-kernel on the second node facilitates writing of the received contents to a set of blocks of the physical block storage device on the second node, the set of blocks of the physical block storage device corresponding to the set of blocks of the virtual block storage device.

In one embodiment, each guest physical address is treated individually in a corresponding descriptor. If multiple pages are involved in the disk write, then a chain of descriptors is forwarded to the second node. For example, when writing to a virtio disk, a command queue is sent. The command queue includes a list of pages to write and where on the disk to write them. While the command queue is signaled in order, the virtio does not guarantee that the pages will be written in that order. For example, if 95 different blocks are sent to the disk to be written, the device effectively executes 95 different sub operations, one for each block. Thus, blocks of content may be written to the disk as they are obtained at the second node from other nodes, and the contents do not need to be written in a specific order (e.g., it is not necessary to wait on obtaining all of the contents of the pages before they are written to the disk).

Upon completion of the write to disk I/O operation, the guest operating system is notified of the completion of the I/O operation.

In the above, it is determined at 1454 that the virtual block storage device is implemented by a physical block storage device on a second node. If, however, it is determined instead, at 1454, that the virtual block storage device is implemented by a physical block storage device on the first node, then the descriptor does not need to be forwarded to a remote node. Instead, the descriptor is locally accessed, steps 1456-1458 need not be performed, and steps 1460-1462 are performed by the first node.

Virtio Net

Each virtio net device has two virt queues: receive and transmit. There is also a control vq (used as a control channel).

The receive ring is provided as a list of guest physical addresses that are filled in as packets are received.

The transmit ring offers frames that need to be delivered to the Ethernet device.

Receive Queue

Figure 15A:
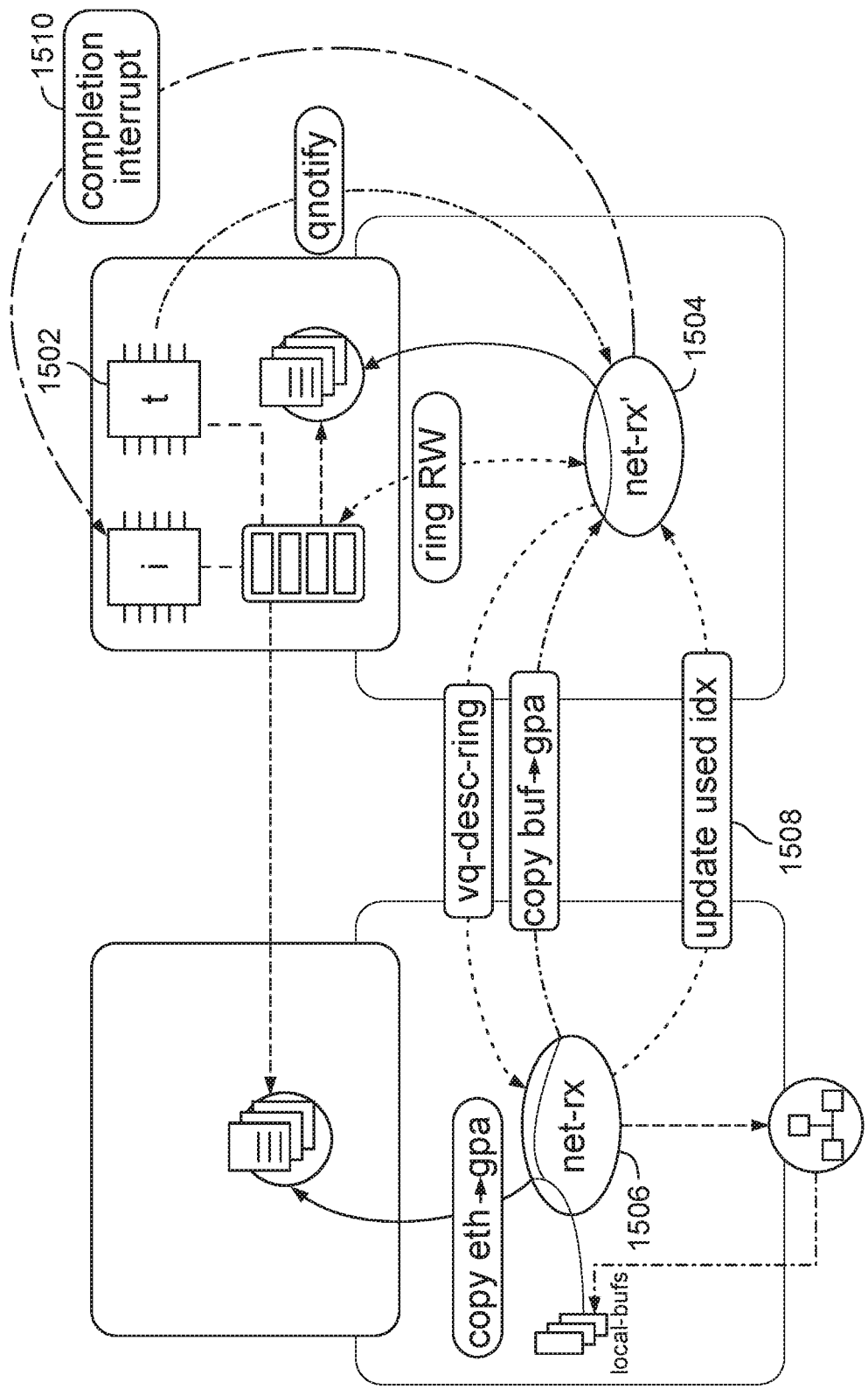
FIG. 15A illustrates an embodiment of network I/O emulation.

FIG. 15A illustrates an embodiment of a receive queue. As shown in this example, a thread t (1502) makes a notification of new receive buffers (e.g., guest receive buffers/guest physical addresses) being offered. As shown in this example, the thread t is on a different node than the physical network device.

A proxy net-rx' receive device emulation (1504) reads in the complete descriptor ring and forwards it to the primary net-rx (1506). In one embodiment, net-rx is the primary virtual network device receive queue handler, where net-rx' is the proxy. In some embodiments, the net-rx and net-rx' refer to the VIOPs on the node with the device and on other nodes, respectively (similarly as to described above with respect to "blk" and "blk'").

The primary net-rx (1506) identifies if the receive buffers (guest physical addresses involved in the network receive request) are local or remote. In one embodiment, if the guest physical addresses are mapped to local pages, then the frames are read directly into the pages of local memory corresponding to the guest physical addresses. Otherwise, they are copied to a local buffer ring (e.g., pages of local memory, such as memory on the host local to the virtual device). The guest physical addresses may then be remapped to the pages of local memory. In other embodiments, the frames copied into the local buffer ring are transferred to remote guest physical addresses via net-rx'.

Completion of one or more used idx is pushed into the virt-queue descriptor (1508).

The guest is notified of completions (e.g., via completion interrupt 1510).

In some embodiments, for each Ethernet frame, the first guest buffer (e.g., memory descriptor or guest physical addresses) has the number of buffers used to fulfill the size of the frame. Since, in one embodiment, receive chains are single descriptors, they are released as individual descriptor elements even when multiple buffers are used to fit in an Ethernet frame.

In one embodiment, a used ring update order matches a packet receive order; in one embodiment, this is handled by the primary net-rx handler.

Transmit Queue

Figure 15B:
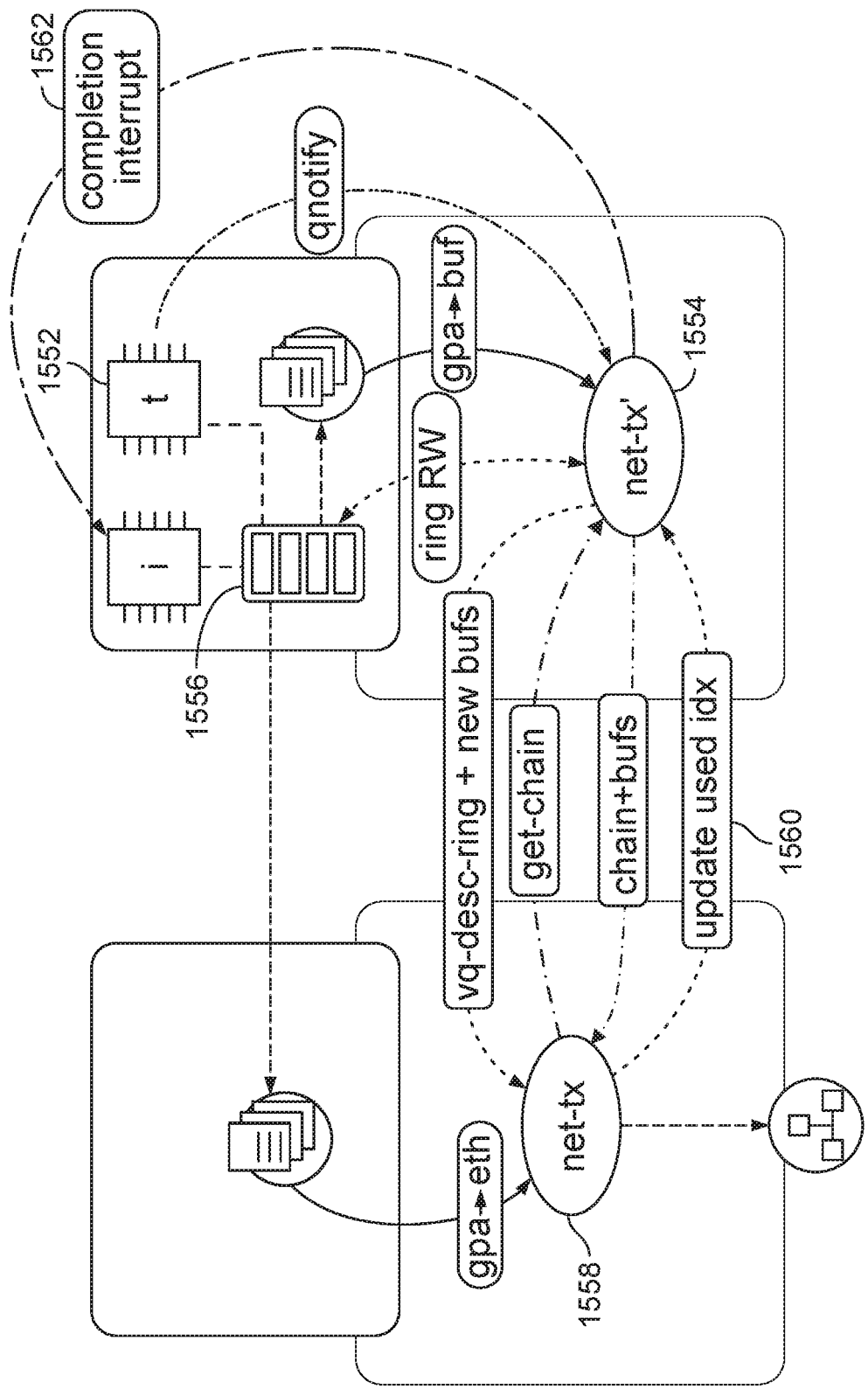
FIG. 15B illustrates an embodiment of network I/O emulation.

FIG. 15B illustrates an embodiment of a transmit queue.

As shown in this example, a thread t (1552) notifies of new buffers (e.g., guest physical memory addresses/buffers) being offered. As shown in this example, the thread t is on a different node than the physical network device.

A proxy net-tx' (1554) reads in the complete descriptor ring (1556) and forwards it to primary net-tx (1558), along with pages corresponding to guest physical addresses that are locally available and have not been sent to the primary net-tx.

Net-tx identifies the tx pages that are local, in which case it sends those pages directly to the Ethernet port. Otherwise it requests the chains from net-rx'.

Completion on one or more used idx is pushed into the virt-queue descriptor (1560).

The guest is notified of completions (e.g., using completion interrupt 1562).

In some embodiments, similar to RX, the used ring update order matches the packet sent order; in one embodiment, this is handled by the primary net-tx handler.

In contrast to transferring data from a block device to a page of memory, in the case of virtualized network I/O, the I/O transfer (e.g., read from the network device) does not occur immediately (i.e., it occurs asynchronously with the request). For example, the guest may pre-emptively issue a request to write data from an incoming packet into a set of guest physical addresses, before the packet is received. This is because it may not be predictable when the packet will be received over a network (e.g., such as the Internet). This is in contrast to a read from a block device, which is synchronous, since the device is told to read data that already exists on the disk into a portion of memory.

Figure 16A:
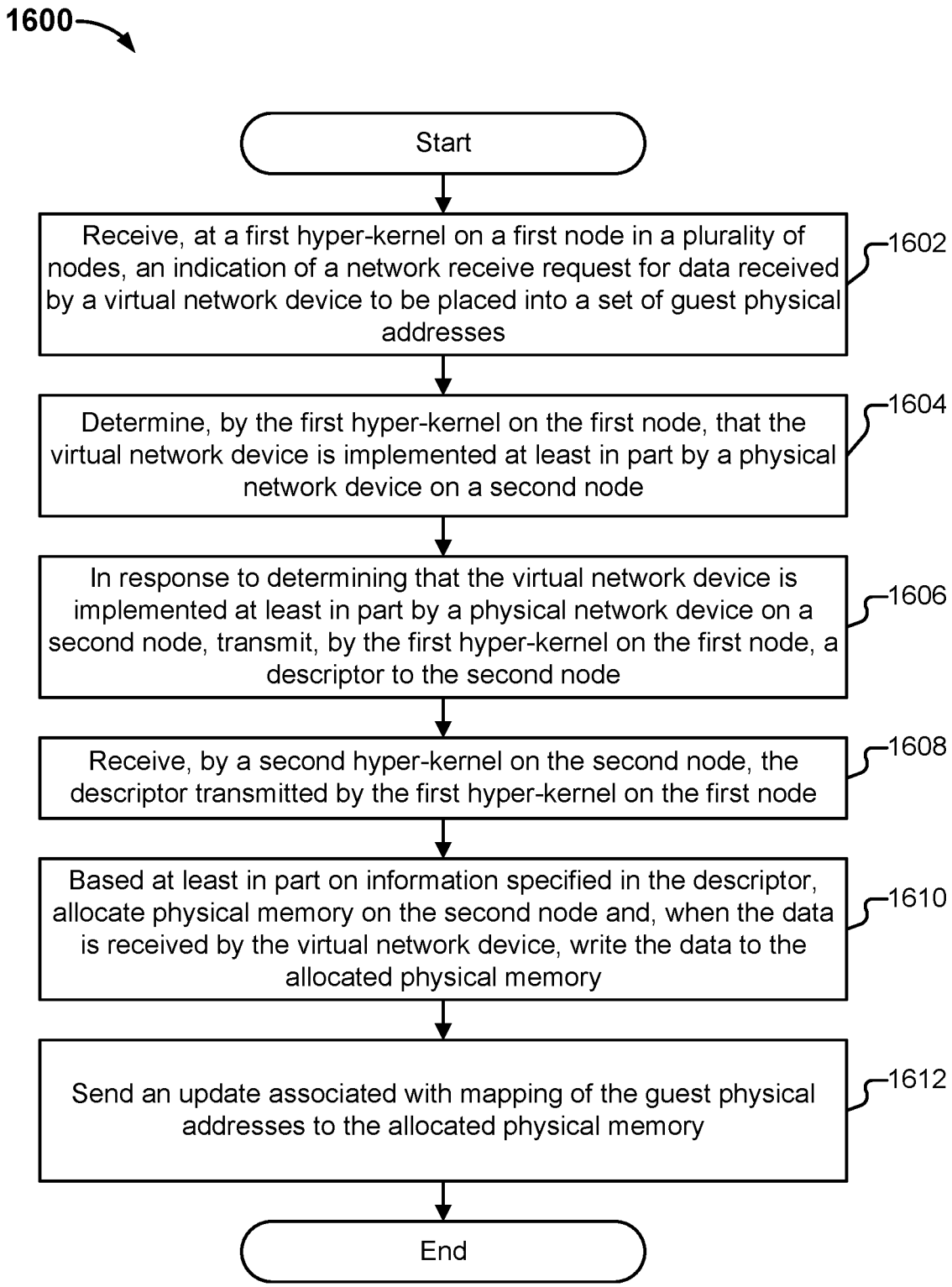
FIG. 16A is a flow diagram illustrating an embodiment of a process for receiving data from a network device into a set of guest physical addresses.

FIG. 16A is a flow diagram illustrating an embodiment of a process for receiving data from a network device into a set of guest physical addresses. In some embodiments, process 1600 is executed by a set of distributed hyper-kernels executing on a plurality of physical nodes. The process begins at 1602 when a first hyper-kernel on a first node receives an indication of a network receive request for data received by a virtual network device to be placed into a set of guest physical addresses.

As one example, a virtual network device is provided with a set of guest memory ranges. The I/O request specifies that when a packet is received over a network (at some time in the future), the memory ranges indicate a list of possible locations where the packet may be put into. In this example, the I/O transfer may occur much later than the request (the expected time of completion is one difference between block and network devices).

For example, suppose that a request was sent out over a network to request some data over a network port. A guest thread requests that when a packet arrives on a virtual network interface controller (NIC), the packet should be placed in a particular range of guest physical addresses. It is not known when the packet will arrive, but the guest operating system reserves the guest physical memory for storing the expected packets.

Suppose, for example, that the guest thread making the request is running in a VCPU that is implemented by a physical CPU on the first node. The hyper-kernel on the first node, through, for example, a network device emulation subsystem (e.g., primary blk or proxy blk'), detects the request to read a packet from the virtual NIC into a guest physical address, when the packet arrives.

At 1604, the first hyper-kernel determines that the virtual network device is implemented at least in part by a physical network device on a second node in the plurality of physical nodes.

At 1606, in response to determining that the virtual network device is implemented at least in part by a physical network device on the second node, the first hyper-kernel transmits a descriptor to the second node, the descriptor specifying information usable to implement the network receive request.

At 1608, the second hyper-kernel on the second node receives the descriptor transmitted by the first node.

At 1610, based at least in part on the descriptor, the second hyper-kernel on the second node allocates physical memory on the second node. When the packet or the data of the packet received by the physical network device is received, it is written to the portion of the second node's local physical memory that has been allocated for storing the packet. The set of guest physical addresses are mapped to the physical memory allocated on the second node into which the received network data was written.

At 1612, an update associated with the mapping of the guest physical addresses to the allocated physical memory is transmitted. In some embodiments, the hyper-kernel on the second node notifies other nodes of the system that the second node now has ownership of the set of guest physical addresses. In other embodiments, the hyper-kernel on the first node, on which the initial I/O request had originated, pre-emptively performs the notification to the other nodes in the system (e.g., when forwarding the descriptor to the second node), since the first node is aware of the guest physical addresses that will be overwritten on the second node. The notification of the remapping of the set of guest physical addresses facilitates maintenance of memory consistency. Thus, the remapping notification may be from the node from which the I/O request originated or from the node with the physical I/O device implementing the virtual I/O device (which may potentially be the same node). The choice of where the notification is made may be presented as an option to a developer.

In the above, it is determined at 1604 that the virtual network device is implemented by a physical network device on a second node. If, however, it is determined instead, at 1604, that the virtual network device is implemented by a physical network device on the first node, then the descriptor does not need to be forwarded to a remote node. Instead, the descriptor is locally accessed, steps 1606-1608 need not be performed, and steps 1610-1612 are performed by the first node.

The following is one example optimization with respect to guest threads and the packets that are received and read. In the case of block I/O, if a particular guest thread directs a VCPU to read data from a particular block of disk into a particular set of memory pages, then it is likely that the next action taken by the guest thread is to read those pages.

In the case of network I/O, a guest thread indicates locations in guest physical memory to place received packets, but it is unknown if the guest thread will access the data in the packets, as it is dependent on the contents of the packet.

For example, a particular guest thread provides buffers (indicates locations in guest physical memory) to receive packets into. A guest system may have multiple different Transmission Control Protocol (TCP) connections active, off to other different machines across a network such as the Internet, a Local Area Network (LAN), etc.

When a packet comes in over the network, the packet may be randomly associated with one of those multiple connections. In some cases, which of those connections that the packet is for will indicate what guest thread is going to access the packet next.

One example optimization is to maintain a mapping of network connections and guest threads. The mapping is then used to predict which node the page with the packet of data should be on—that is, it should be on the same node as the thread that is predicted to access the page based on the mapping.

Figure 16B:
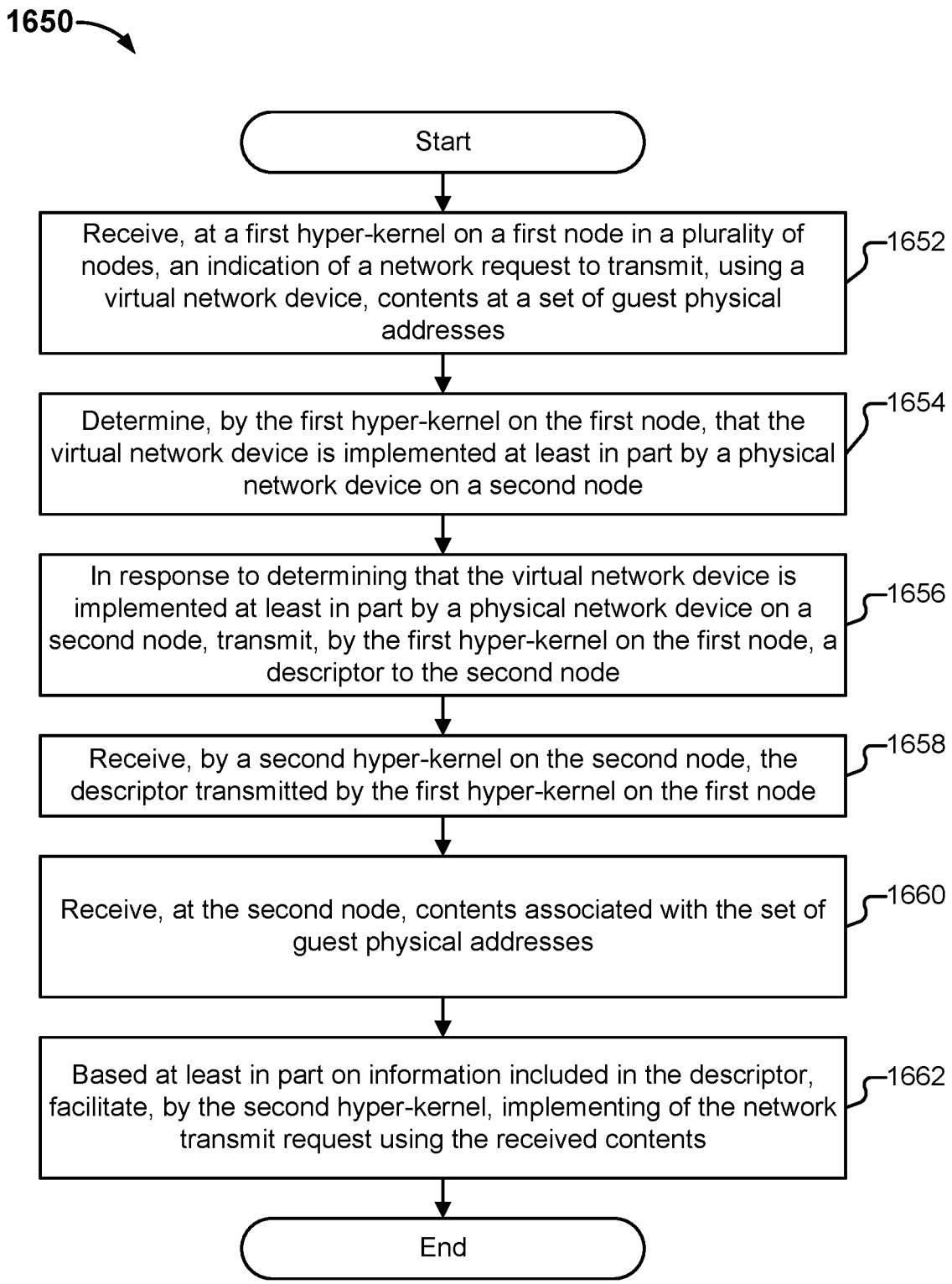
FIG. 16B is a flow diagram illustrating an embodiment of a process for delivering contents of a set of guest physical addresses to a network device for transmission over a network.

FIG. 16B is a flow diagram illustrating an embodiment of a process for delivering contents of a set of guest physical addresses to a network device for transmission over a network. In some embodiments, process 1650 is executed by a set of distributed hyper-kernels executing on a plurality of physical nodes. The process begins at 1652 when a first hyper-kernel on a first node receives an indication of a network request to transmit, using a virtual network device, contents at a set of guest physical addresses.

One example of a write request is to transmit the contents of the set of guest physical addresses through a network interface.

At 1654, the first hyper-kernel determines that the virtual network device is implemented at least in part by a physical network device on a second node in the plurality of physical nodes.

At 1656, in response to determining that the virtual network device is implemented at least in part by a physical network device on the second node, a descriptor is transmitted to the second node, the descriptor specifying information usable to implement the request. For example, the first node obtains the descriptor that was locally written to a portion of the physical memory local to the first node, just prior to the issuing of the I/O request.

In some embodiments, if the first node has any of the pages mapped to the guest physical addresses specified in the I/O request (even if they are replicated secondary copies), the first hyper-kernel on the first node also sends the contents of those subsets of pages along with the I/O request forwarded to the second node.

In some embodiments, the first node also transmits a message to the other nodes of the system to send the contents of whatever subset of pages they have to the second node. As one optimization, "piggy-backing" off of the forwarding of the descriptor is performed, where instead of unicasting the request with the descriptor only to the second node (as part of the descriptor forwarding), the I/O request is broadcasted to the other nodes of the system, so that the other nodes are aware of the I/O operation being requested, and may pre-emptively send contents of whatever subsets of pages they may have to the second node. If a node does not have any of the pages, then it may disregard the broadcasted I/O request. This "piggy-backing" approach of broadcasting the forwarded I/O request is efficient, as a separate request message does not need to be made.

At 1658, a second hyper-kernel on the second node receives the descriptor transmitted by the first node.

At 1660, the second hyper-kernel receives the contents at the set of guest physical addresses. As described above, the contents may be received in response to the first node transmitting messages that cause the other nodes in the software defined server to send whatever page contents they have to the second node. In other embodiments, when the second node receives the request to deliver data to the network device to be transmitted over a network, the second node determines what guest physical addresses the second node has pages for. For those pages that the second node does not have, the second node sends out one or more messages to the system requesting content for whatever subsets of pages the other nodes have.

At 1662, based at least in part on information included in the descriptor, the second hyper-kernel facilitates implementing the network transmit request at least in part by directing the physical network device to transmit, over a network, the received content at the set of guest physical addresses. For example, the contents at the set of guest physical addresses is transmitted over the network using the physical NIC on the second node.

When the I/O is completed, a notification is sent to the guest operating system, notifying the guest operating system of the completion of the I/O request. As described above, in one embodiment, when the I/O is completed, a virtual interrupt is emulated and delivered to the guest operating system in a manner expected by the guest operating system.

In the above, it is determined at 1654 that the virtual network device is implemented by a physical block storage device on a second node. If, however, it is determined instead, at 1654, that the virtual network device is implemented by a physical block storage device on the first node, then the descriptor does not need to be forwarded to a remote node. Instead, the descriptor is locally accessed, steps 1656-1658 need not be performed, and steps 1660-1662 are performed by the first node.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computing node, comprising:
a set of processors to run a first hyper-kernel;
an input/output (I/O) device to provide data associated with an I/O operation to the computing node; and
a memory device is to store the data in one or more portions of a physical memory space of the memory device;
wherein a guest operating system executes on a virtual environment that is defined by a set of hyper-kernels running on a plurality of interconnected computing nodes, and wherein the set of hyper-kernels includes the first hyper-kernel and presents, in conjunction with each other, unified processing and memory resources of the plurality of interconnected computing nodes to the guest operating system;
wherein the first hyper-kernel is to:
  receive, at the computing node, an indication of a request to transfer the data to a set of guest physical addresses presented to the guest operating system; and
  determine physical addresses of the one or more portions of the physical memory space of the memory device mapped to the set of guest physical addresses, wherein a quest physical address in the set of quest physical addresses is remapped from a previous physical address associated with a second computing node in the plurality of interconnected computing nodes to a new physical address associated with the computing node, and wherein the second computing node is to invalidate the previous physical address;
wherein the I/O device is to deliver, to the first hyper-kernel, an interrupt indicating completion of providing the data of the I/O operation associated with the one or more portions of physical memory space; and
wherein, in response to receiving the interrupt, the first hyper-kernel is to deliver a virtual interrupt indicating completion of the I/O operation to the guest operating system via a virtual processor of the virtual environment.

2. The computing node of claim 1, wherein the first hyper-kernel is to send one or more messages to corresponding one or more other computing nodes in the plurality of interconnected computing nodes, wherein the one or more messages comprise the mapping of the set of guest physical addresses to the physical memory space of the computing node.

3. The computing node of claim 1, wherein the I/O operation of the I/O device comprises directly accessing the one or more portions of physical memory corresponding to the set of guest physical addresses.

4. The computing node of claim 1, wherein the indication of the request comprises a descriptor locally accessible on the computing node.

5. The computing node of claim 1, wherein the indication of the request comprises a descriptor received from a second computing node in the plurality of interconnected computing nodes.

6. The computing node of claim 1, wherein the request comprises a request to read data from a virtual block device.

7. The computing node of claim 1, wherein the request comprises a request to read data via a network from the set of guest physical addresses from a virtual network device.

8. A method, comprising:
running, on a set of processors of a first computing node in a plurality of interconnected computing nodes, a first hyper-kernel;
providing, by an input/output (I/O) device of the first computing node, data associated with an I/O operation to the first computing node;
storing, in a memory device of the first computing node, the data in one or more portions of a physical memory space of the memory device;
receiving, by the first hyper-kernel, an indication of a request to transfer the data to a set of guest physical addresses presented to a guest operating system, wherein the guest operating system executes on a virtual environment that is defined by a set of hyper-kernels running on the plurality of interconnected computing nodes, and wherein the set of hyper-kernels includes the first hyper-kernel and presents, in conjunction with each other, unified processing and memory resources of the plurality of interconnected computing nodes to the guest operating system;

mapping the set of guest physical addresses to physical addresses of the one or more portions of the physical memory space of the memory device, wherein a quest physical address in the set of quest physical addresses is remapped from a previous physical address associated with a second computing node in the plurality of interconnected computing nodes to a new physical address associated with the computing node, and wherein the second computing node is to invalidate the previous physical address;

delivering, by the I/O device to the first hyper-kernel, an interrupt indicating completion of providing the data of the I/O operation associated with the one or more portions of physical memory space; and in response to receiving the interrupt, delivering, by the first hyper-kernel, a virtual interrupt to the guest operating system via a virtual processor of the virtual environment.

9. The method of claim 8, further comprising, sending, by the first hyper-kernel, one or more messages to corresponding one or more other computing nodes in the plurality of interconnected computing nodes, wherein the one or more messages comprise the mapping of the set of guest physical addresses to the physical memory space of the computing node.

10. The method of claim 8, wherein the indication of the request comprises a descriptor, and wherein the descriptor is accessed locally on the first computing node or received from a second computing node in the plurality of interconnected computing nodes.

11. A computing node, comprising:
a set of processors to run a first hyper-kernel;
an input/output (I/O) device to receive data associated with an I/O operation; and
a memory device is to facilitate a physical memory space;
wherein a guest operating system executes on a virtual environment that is defined by a set of hyper-kernels running on a plurality of interconnected computing nodes, and wherein the set of hyper-kernels includes the first hyper-kernel and presents, in conjunction with each other, unified processing and memory resources of the plurality of interconnected computing nodes to the guest operating system;
wherein the first hyper-kernel is to:
receive, at the computing node, an indication of a request to transfer, to the I/O device, the data, which is associated with a set of guest physical addresses presented to the guest operating system;
determine physical addresses of one or more portions of the physical memory space of the memory device mapped to the set of guest physical addresses, wherein a quest physical address in the set of guest physical addresses is remapped from a previous physical address associated with a second computing node in the plurality of interconnected computing nodes to a new physical address associated with the computing node, and wherein the second computing node is to invalidate the previous physical address;
wherein contents of the one or more portions of physical memory space are aggregated at the computing node;
wherein the aggregated contents are transferred to the I/O device;
wherein the I/O device is to deliver, to the first hyper-kernel, an interrupt indicating completion of providing the data of the transfer of the aggregated contents; and
wherein, in response to receiving the interrupt, the first hyper-kernel is to deliver a virtual interrupt indicating the I/O operation to the guest operating system via a virtual processor of the virtual environment.

12. The computing node of claim 11, wherein the first hyper-kernel is to send one or more messages to corresponding one or more other computing nodes in the plurality of interconnected computing nodes, wherein the one or more messages request data associated with corresponding subsets of the set of guest physical addresses owned by the respective one or more other computing nodes.

13. The computing node of claim 11, wherein the indication of the request to transfer data comprises a descriptor locally accessible on the computing node.

14. The computing node of claim 11, wherein the indication of the request to transfer data comprises a descriptor received from a second computing node in the plurality of interconnected computing nodes.

15. The computing node of claim 11, wherein the request comprises a request to write data associated with the set of guest physical addresses to a virtual block device.

16. The computing node of claim 11, wherein the request comprises a request to transmit data associated with the set of guest physical addresses over a network using a virtual network device.

17. A method, comprising:
running, on a set of processors of a first computing node in a plurality of interconnected computing nodes, a first hyper-kernel;
receiving, by an input/output (I/O) device of the first computing node, data associated with an I/O operation; and
facilitating, by a memory device of the first computing node, a physical memory space;
receiving, by the first hyper-kernel, an indication of a request to transfer, to the I/O device, the data, which is associated with a set of guest physical addresses presented to a guest operating system, wherein the guest operating system executes on a virtual environment that is defined by a set of hyper-kernels running on the plurality of interconnected computing nodes, wherein the set of hyper-kernels includes the first hyper-kernel and presents, in conjunction with each other, unified processing and memory resources of the plurality of interconnected computing nodes to the guest operating system; and
determining, by the first hyper-kernel, physical addresses of one or more portions of the physical memory space of the memory device mapped to the set of guest physical addresses, wherein a guest physical address in the set of quest physical addresses is remapped from a previous physical address associated with a second computing node in the plurality of interconnected computing nodes to a new physical address associated with the computing node, and wherein the second computing node is to invalidate the previous physical address;
aggregating, at the first computing node, contents of the one or more portions of physical memory space;
transferring the aggregated contents to the I/O device;
delivering, by the I/O device to the first hyper-kernel, an interrupt indicating completion of the transfer of the aggregated contents to the I/O device; and
in response to receiving the interrupt, delivering, by the first hyper-kernel, a virtual interrupt indicating the I/O operation to the guest operating system via a virtual processor of the computing node.

18. The method of claim 17, further comprising, sending, by the first hyper-kernel, one or more messages to corresponding one or more other computing nodes in the plurality of interconnected computing nodes, wherein the one or more messages request data associated with corresponding subsets of the set of guest physical addresses owned by the respective one or more other nodes.

* * * * *